(12) United States Patent
Saito

(10) Patent No.: US 11,975,755 B2
(45) Date of Patent: May 7, 2024

(54) SCREW SHAFT AND METHOD FOR PRODUCING SAME, AND ELECTRIC POSITION-ADJUSTING DEVICE FOR STEERING WHEEL

(71) Applicant: NSK LTD., Tokyo (JP)

(72) Inventor: Takeshi Saito, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/031,559

(22) PCT Filed: Oct. 11, 2021

(86) PCT No.: PCT/JP2021/037632
§ 371 (c)(1),
(2) Date: Apr. 12, 2023

(87) PCT Pub. No.: WO2022/080331
PCT Pub. Date: Apr. 21, 2022

(65) Prior Publication Data
US 2023/0406394 A1    Dec. 21, 2023

(30) Foreign Application Priority Data

Oct. 13, 2020   (JP) .................................. 2020-172548

(51) Int. Cl.
*B62D 1/181* (2006.01)
*B21H 3/04* (2006.01)

(52) U.S. Cl.
CPC ............... *B62D 1/181* (2013.01); *B21H 3/04* (2013.01)

(58) Field of Classification Search
CPC ............ B62D 1/181; B21H 3/04; F16H 25/24
See application file for complete search history.

(56) References Cited

U.S. PATENT DOCUMENTS 7,228,751 B2 * 6/2007 Nagai ................. F16H 25/2204
74/89.44
7,241,088 B2 * 7/2007 Malagnino ............... B23G 5/06
408/222

(Continued)

FOREIGN PATENT DOCUMENTS

DE       102007062437 A1 * 10/2009 ............... B21H 1/18
EP          4228126 A1 *  8/2023 ............. B60T 13/74

(Continued)

OTHER PUBLICATIONS

International Search Report (PCT/ISA/210) issued from the International Searching Authority dated Dec. 21, 2021 to International Application No. PCT/JP2021/037632.

(Continued)

*Primary Examiner* — Drew J Brown
(74) *Attorney, Agent, or Firm* — Sughrue Mion, PLLC

(57) ABSTRACT

Provided is a screw shaft in which shape accuracy of a male threaded portion is sufficiently secured. A screw shaft includes a large-diameter shaft portion, medium-diameter shaft portions and small-diameter shaft portions. The large-diameter shaft portion has a male threaded portion along its entire axial length on its outer peripheral surface. The medium-diameter shaft portions are arranged axially adjacent to the large-diameter shaft portion and have an outer diameter smaller than an outer diameter of the large-diameter shaft portion. The small-diameter shaft portions are axially arranged adjacent to the medium-diameter shaft portions on sides opposite to the large-diameter shaft portion, have an outer diameter smaller than the outer diameter of each of the medium-diameter shaft portions, and do not have rolling traces having a helical shape on their outer peripheral surfaces.

15 Claims, 14 Drawing Sheets

(56) References Cited

U.S. PATENT DOCUMENTS

| | | |
|---|---|---|
| 2002/0124677 A1 | 9/2002 | Tomaru et al. |
| 2004/0144192 A1 | 7/2004 | Tomaru et al. |
| 2015/0069745 A1 | 3/2015 | Iwakawa et al. |
| 2015/0075316 A1 | 3/2015 | Iwakawa et al. |
| 2015/0090067 A1 | 4/2015 | Iwakawa et al. |
| 2016/0039024 A1 * | 2/2016 | Haruta .................... F16H 25/24 470/18 |
| 2021/0309278 A1 | 10/2021 | Saito |

FOREIGN PATENT DOCUMENTS

| | | | |
|---|---|---|---|
| JP | 9-225573 A | 9/1997 | |
| JP | 2005-199760 A | 7/2005 | |
| JP | 2006-321484 A | 11/2006 | |
| JP | 2008-281142 A | 11/2008 | |
| JP | 2009-195930 A | 9/2009 | |
| JP | 53-30864 B2 | 10/2013 | |
| JP | 2015-227166 A | 12/2015 | |
| WO | 2015/129163 A1 | 9/2015 | |
| WO | WO-2018079535 A1 * | 5/2018 | .............. F16C 19/18 |
| WO | WO-2018088540 A1 * | 5/2018 | .............. F16C 19/16 |
| WO | 2020/031637 A1 | 2/2020 | |

OTHER PUBLICATIONS

Written Opinion (PCT/ISA/237) issued from the International Searching Authority dated Dec. 21, 2021 to International Application No. PCT/JP2021/037632.

* cited by examiner

AXIAL ONE SIDE ←

AXIAL OTHER SIDE →

SCREW SHAFT AND METHOD FOR PRODUCING SAME, AND ELECTRIC POSITION-ADJUSTING DEVICE FOR STEERING WHEEL

CROSS-REFERENCE TO RELATED APPLICATIONS

This application is a National Phase Entry of PCT International Application No. PCT/JP2021/037632 filed on Oct. 11, 2021, which claims priority to Japanese Patent Application No. 2020-172548 filed on Oct. 13, 2020, the contents of all of which are incorporated herein by reference in their entirety.

TECHNICAL FIELD

The present invention relates to a screw shaft forming a feed screw mechanism incorporated in various mechanical devices, a manufacturing method thereof, and an electric steering wheel position adjusting device including an electric motor and a feed screw mechanism.

BACKGROUND ART

Various types of electric steering wheel position adjusting devices of the related arts have been known, which enable adjustment of front-rear position and height position of a steering wheel using an electric motor as a drive source (for example, see JP-A-2005-199760 (Patent Literature 1), JP-A-2006-321484 (Patent Literature 2), and JP-A2015-227166 (Patent Literature 3)).

A feed screw mechanism is widely used as a mechanism that is incorporated in various mechanical devices including such an electric steering wheel position adjusting device and converts rotary motion of a drive source into linear motion. The feed screw mechanism includes a screw shaft having a male threaded portion on its outer peripheral surface and a nut having a female threaded portion on its inner peripheral surface.

The feed screw mechanism includes a sliding screw type feed screw mechanism and a ball screw type feed screw mechanism. In the slide screw type feed screw mechanism, a male threaded portion of a screw shaft and a female threaded portion of a nut are threadedly engaged together. In the ball screw type feed screw mechanism, a male threaded portion of a screw shaft forms a male thread groove, a female threaded portion of a nut forms a female thread groove, and a plurality of balls are arranged between the male thread groove and the female thread groove.

In any feed screw mechanism, the male threaded portion of the screw shaft can be formed by rolling processing. In the rolling processing of the male threaded portion, a male threaded portion is formed by, while rolling a workpiece, which is an intermediate material of the screw shaft, between a plurality of rolling dies, plastically deforming an outer peripheral surface of the workpiece using these rolling dies.

Rolling processing methods for the male threaded portion include, for example, various methods such as the through-feed method described in JP-A-H09-225573 (Patent Literature 4) and the in-feed method described in JP-A-2008-281142 (Patent Literature 5).

CITATION LIST

Patent Literature

Patent Literature 1: JP-A-2005-199760
Patent Literature 2: JP-A-2006-321484
Patent Literature 3: JP-A-2015-227166
Patent Literature 4: JP-A-H09-225573
Patent Literature 5: JP-A-2008-281142

SUMMARY OF INVENTION

Technical Problem

A specific example of rolling processing in the through-feed method will be described with reference to FIGS. 11A to 13B. In this specific example, as illustrated in FIGS. 11A and 11B, a workpiece 100 is subjected to the rolling processing in the through-feed method using a pair of rolling dies 101. By forming the male threaded portion 102 in this way, a screw shaft 103 having the male threaded portion 102 is obtained.

In the following description of this specific example, unless otherwise specified, an axial direction means an axial direction of the workpiece 100 and the screw shaft 103, a one axial side is a left side in FIGS. 11A and 11B, and the other axial side is a right side in FIGS. 11A and 11B.

The screw shaft 103 is a screw shaft that forms a ball screw type feed screw mechanism. The screw shaft 103 includes a screw shaft portion 104 and a base end shaft portion 105. The screw shaft portion 104 is present in a portion from one axial end portion of the screw shaft 103 to a portion near the other axial end portion. The screw shaft portion 104 has a male threaded portion (male thread groove) 102 having a helical shape on its outer peripheral surface. The base end shaft portion 105 is present at the other axial end portion of the screw shaft 103. That is, the base end shaft portion 105 is arranged adjacent to the other axial side of the screw shaft portion 104. The base end shaft portion 105 is cylindrical in shape and has an outer diameter larger than that of the screw shaft portion 104.

The workpiece 100 includes a large-diameter shaft portion for rolling 106 and a small-diameter shaft portion for rolling 107, which are subjected to rolling processing to form the screw shaft portion 104, and a base end shaft portion 105 which are not subjected to rolling processing. The large-diameter shaft portion for rolling 106 is cylindrical in shape and has an outer diameter smaller than an outer diameter of the base end shaft portion 105. The small-diameter shaft portion for rolling 107 is arranged adjacent to the other axial side of the large-diameter shaft portion for rolling 106. The small-diameter shaft portion for rolling 107 is cylindrical in shape. The small-diameter shaft portion for rolling 107 has an axial length that is significantly smaller than an axial length of the large-diameter shaft portion for rolling 106, and has an outer diameter smaller than the outer diameter of the large-diameter shaft portion for rolling 106. The base end shaft portion 105 is arranged adjacent to the other axial side of the small-diameter shaft portion for rolling 107.

The pair of rolling dies 101 are round dies each having a short cylindrical shape, and have their outer peripheral surfaces opposed to each other. Each of the rolling dies 101 has rolling teeth 108 having a helical shape on its outer peripheral surface and has chamfered portions 109 on locations adjacent to both axial sides of the rolling teeth 108. Each of the chamfered portions 109 is composed of an inclined surface (conical surface) inclined in a direction toward an axial center side of the rolling die 101 as it extends radially outward. As illustrated enlarged in FIG. 12, a diameter of a small-diameter side end portion of the chamfered portion 109 is approximately equal to a diameter of a root circle of the rolling teeth 108. In addition, the chamfered portion 109 is provided to relieve stress concentration during rolling processing.

When performing rolling processing on the workpiece 100 using the pair of rolling dies 101 using a through-feed method, as illustrated in FIG. 11A, the pair of rolling dies 101 are rotated in the same direction while maintaining a constant distance between the outer peripheral surfaces (tip circles of the rolling teeth 108 of each rolling die 101) of the pair of rolling dies 101. In this case, the distance between the outer peripheral surfaces of the pair of rolling dies 101 is made smaller than respective outer diameters of the large-diameter shaft portion for rolling 106 and the small-diameter shaft portion for rolling 107.

In this state, the workpiece 100 is inserted between the outer peripheral surfaces of the pair of rolling dies 101 from one axial end portion. Then, the rolling teeth 108 of the pair of rolling dies 101 are cut into an outer peripheral surface of the one axial end portion of the workpiece 100, and the workpiece 100 rotates in an opposite direction to the pair of rolling dies 101, in such a manner that the rolling processing to form the male threaded portion 102 begins. In this case, based on a lead angle error that occurs between the rolling teeth 108 of the pair of rolling dies 101 and the male threaded portion formed on the workpiece 100, progress occurs, which is a phenomenon in which the workpiece 100 moves to the one axial side with respect to the pair of rolling dies 101. Therefore, the rolling processing proceeds automatically.

That is, while the workpiece 100 moves to the one axial side with respect to the pair of rolling dies 101, the rolling teeth 108 of the pair of rolling dies 101 sequentially plastically deform the large-diameter shaft portion for rolling 106 and the small-diameter shaft portion for rolling 107, which are processing target portions. As a result, the male threaded portion 102 is formed as illustrated in FIG. 11B. FIG. 13A is a partially enlarged view of FIG. 11B. Then, when the male threaded portion 102 is formed in this way, the pair of rolling dies 101 are retracted in a direction away from each other in a radial direction, thereby completing the rolling processing.

In addition, in this specific example, similar to the workpiece described in JP-A-H09-225573, the small-diameter shaft portion for rolling 107 having an outer diameter smaller than the outer diameter of the large-diameter shaft portion for rolling 106 is present at the other axial end portion of the processing target portion of the workpiece 100. Therefore, the part of the large-diameter shaft portion for rolling 106 that flows due to the rolling processing can escape to the small-diameter shaft portion for rolling 107. As a result, while sufficiently securing the outer diameter of the other axial end portion of the male threaded portion 102, it is easy to prevent the other axial end portion of the male threaded portion 102 from protruding radially outward compared to a portion adjacent to the one axial side.

However, when performing the rolling processing as described above, the following problems may occur. That is, when performing the rolling processing as described above, the processing target portion of the workpiece 100 is subjected to rolling processing by not only the rolling teeth 108 of the pair of rolling dies 101 but also the chamfered portion 109 located at the other axial end portion of each of the pair of rolling dies 101.

When performing the rolling processing, the inclined surface forming the chamfered portion 109 on the other axial side of each of the pair of rolling dies 101 rides on the processing target portion of the workpiece 100. Then, a large load directed radially inward and axially toward the other side acts on a part of the processing target portion of the workpiece 100 on which the inclined surface rides. As a reaction force of a radial component of such a load, the rolling die 101 receives a load in a direction in which the rolling die 101 escapes from the processing target portion, that is, a load directed radially outward. As a result of the inclined surface forming the chamfered portion 109 riding on the processing target portion of the workpiece 100, excessive elongation or twisting of the workpiece 100 may occur starting from the part of the processing target portion of the workpiece 100 on which the inclined surface rides. Along with this, shape errors such as tooth profile errors, tooth trace errors, and screw pitch errors of the male threaded portion 102 may occur, and the shape accuracy of the male threaded portion 102 may be lowered. Furthermore, generally, in the rolling processing of the male threaded portion 102, a problem arises in that radial burrs and bulges are formed on the outer peripheral surface and axial end portion of the processing target portion due to the elongation of the shaft and the extremely high axial thrust generated during processing. In particular, in the portion where the chamfered portion 109 of the rolling die 101 rides on, the biased screw thrust concentrates on one point, which tends to deteriorate the shape accuracy of the male threaded portion 102.

Further, in a final stage of rolling processing illustrated in FIGS. 11B, 13A, and 13B, at the other axial end portion of the male threaded portion 102, the part pushed toward the other axial side cannot escape, and an inclined surface forming the chamfered portion 109 rides on a part (β portion in FIG. 13B) of the part. As a result, the part pressed by the inclined surface strongly presses and deforms one axial end surface of the base end shaft portion 105, causing a relatively large pitch deviation or the like in the male threaded portion 102. Therefore, the shape error of the male threaded portion 102 is particularly likely to deteriorate in the final stage of the rolling processing. In addition, when radial burrs or bulges are formed at the other axial end portion of the male threaded portion 102, and these burrs or bulges become large enough to interfere with the female threaded portion of the nut, the nut cannot be moved axially around the other axial end portion of the male threaded portion 102, which shortens an operating stroke of the feed screw mechanism.

Inconveniences such as those described above, that is, inconveniences that shape accuracy of the male threaded portion may be lowered due to the inclined surface that forms the chamfered portion of the rolling die riding on the processing target portion of the workpiece when rolling processing is performed, are not limited to occur in the rolling processing by the through-feed method, but also occur in other types of rolling processing such as an in-feed method.

An object of the present invention is to provide a screw shaft in which shape accuracy of a male threaded portion is sufficiently ensured, a manufacturing method of the screw shaft, and an electric steering wheel position adjusting device which includes an electric motor and a feed screw mechanism and sufficiently ensures an operation performance of the feed screw mechanism.

Solution to Problem

A screw shaft according to an aspect of the present invention includes a large-diameter shaft portion, and a medium-diameter shaft portions arranged adjacent to both axial end sides of the large-diameter shaft portion.

The large-diameter shaft portion has a male threaded portion along an entire axial length on an outer peripheral surface.

The medium-diameter shaft portion has an outer diameter smaller than an outer diameter of the large-diameter shaft portion and has, on an outer peripheral surface, a rolling trace with a helical shape that is in phase with an extension line of a helical curve that is a groove bottom line of the male threaded portion.

In the screw shaft according to the aspect of the present invention, the outer diameter of the medium-diameter shaft portion is 0.93 times or more and 1.07 times or less a groove bottom diameter (root diameter, groove bottom circle diameter) of the male threaded portion.

A screw shaft according to an aspect of the present invention includes a large-diameter shaft portion, a medium-diameter shaft portion, and a small-diameter shaft portion.

The large-diameter shaft portion has a male threaded portion along an entire axial length on an outer peripheral surface.

The medium-diameter shaft portion is arranged axially adjacent to the large-diameter shaft portion and has an outer diameter smaller than an outer diameter of the large-diameter shaft portion.

The small-diameter shaft portion is arranged adjacent to the medium-diameter shaft portion on a side opposite to the large-diameter shaft portion in an axial direction, has an outer diameter smaller than the outer diameter of the medium-diameter shaft portion, and does not have a rolling trace with a helical shape on an outer peripheral surface.

In the screw shaft according to the aspect of the present invention, the medium-diameter shaft portion has, on an outer peripheral surface, a rolling trace with a helical shape that is in phase with an extension line of a helical curve that is a groove bottom line of the male threaded portion.

In the screw shaft according to the aspect of the present invention, an adjacent shaft portion having an outer diameter larger than the outer diameter of the medium-diameter shaft portion is provided adjacent to the small-diameter shaft portion on a side opposite to the large-diameter shaft portion in the axial direction.

In the screw shaft according to the aspect of the present invention, the outer diameter of the medium-diameter shaft portion is 0.93 times or more and 1.07 times or less a groove bottom diameter (root diameter, groove bottom circle diameter) of the male threaded portion.

In the screw shaft according to the aspect of the present invention, the outer diameter of the small-diameter shaft portion is 0.9 times or more and less than 1.0 times the groove bottom diameter of the male threaded portion.

In the screw shaft according to the aspect of the present invention, the medium-diameter shaft portion is composed of a first medium-diameter shaft portion arranged on one axial side of the large-diameter shaft portion and a second medium-diameter shaft portion arranged on the other axial side of the large-diameter shaft portion, and the small-diameter shaft portion is composed of at least one of a first small-diameter shaft portion arranged on one axial side of the first medium-diameter shaft portion and a second small-diameter shaft portion arranged on the other axial side of the second medium-diameter shaft portion.

In the screw shaft according to the aspect of the present invention, the screw shaft can be incorporated in an electric steering wheel position adjusting device.

A manufacturing method of a screw shaft according to an aspect of the present invention includes performing rolling processing on a workpiece, the workpiece including a large-diameter shaft portion for rolling and medium-diameter shaft portions for rolling arranged adjacent to both axial end sides of the large-diameter shaft portion for rolling and each having an outer diameter smaller than an outer diameter of the large-diameter shaft portion for rolling, using a plurality of rolling dies to create progress of the workpiece in order to form a male threaded portion over an entire axial length of an outer peripheral surface of the large-diameter shaft portion for rolling.

In performing the rolling processing on the workpiece, rolling processing is performed, using the rolling dies, to form rolling traces with a helical shape on outer peripheral surfaces of the medium-diameter shaft portions for rolling and to form a male threaded portion on the outer peripheral surface of the large-diameter shaft portion for rolling.

In the manufacturing method of the screw shaft according to the aspect of the present invention, an outer diameter of the medium-diameter shaft portion for rolling is 0.93 times or more and 1.07 times or less a groove bottom diameter of the male threaded portion to be formed on the outer peripheral surface of the large-diameter shaft portion for rolling.

A manufacturing method of a screw shaft according to an aspect of the present invention includes performing rolling processing on a workpiece, the workpiece including a large-diameter shaft portion for rolling, a medium-diameter shaft portion for rolling arranged axially adjacent to the large-diameter shaft portion for rolling and having an outer diameter smaller than an outer diameter of the large-diameter shaft portion for rolling, and a small-diameter shaft portion arranged adjacent to the medium-diameter shaft portion for rolling on a side opposite to the large-diameter shaft portion for rolling in an axial direction and having an outer diameter smaller than the outer diameter of the medium-diameter shaft portion for rolling, using a plurality of rolling dies to create progress of the workpiece in order to form a male threaded portion over an entire axial length of an outer peripheral surface of the large-diameter shaft portion for rolling.

In performing the rolling processing on the workpiece, rolling processing is performed, using the rolling dies, to form a male threaded portion on the outer peripheral surface of the large-diameter shaft portion for rolling, and the rolling dies are not brought into contact with an outer peripheral surface of the small-diameter shaft portion.

In the manufacturing method of the screw shaft according to the aspect of the present invention, in performing the rolling processing on the workpiece, a rolling trace with a helical shape is formed on an outer peripheral surface of the medium-diameter shaft portion for rolling.

In the manufacturing method of the screw shaft according to the aspect of the present invention, a workpiece having an adjacent shaft portion arranged adjacent to the small-diameter shaft portion on a side opposite to the large-diameter shaft portion for rolling in the axial direction and having an outer diameter larger than the outer diameter of the medium-diameter shaft portion for rolling is used as the workpiece.

In the manufacturing method of the screw shaft according to the aspect of the present invention, the outer diameter of the medium-diameter shaft portion for rolling is 0.93 times or more and 1.07 times or less a groove bottom diameter of the male threaded portion to be formed on the outer peripheral surface of the large-diameter shaft portion for rolling, and the outer diameter of the small-diameter shaft portion is 0.9 times or more and less than 1.0 times the groove bottom diameter of the male threaded portion.

In the manufacturing method of the screw shaft according to the aspect of the present invention, a rolling die having a chamfered portion at an axial end portion of an outer peripheral surface is used as each of the rolling dies, and a state in which the chamfered portion faces the outer peripheral surface of the small-diameter shaft portion is maintained in performing the rolling processing on the workpiece.

In the manufacturing method of the screw shaft according to the aspect of the present invention, a workpiece in which the medium-diameter shaft portion for rolling is composed of a first medium-diameter shaft portion for rolling arranged on one axial side of the large-diameter shaft portion for rolling and a second medium-diameter shaft portion for rolling arranged on the other axial side of the large-diameter shaft portion for rolling, and the small-diameter shaft portion is composed of at least one of a first small-diameter shaft portion arranged on one axial side of the first medium-diameter shaft portion for rolling and a second small-diameter shaft portion arranged on the other axial side of the second medium-diameter shaft portion for rolling is used as the workpiece.

In the manufacturing method of the screw shaft according to the aspect of the present invention, a screw shaft incorporated in an electric steering wheel position adjusting device is applied as the screw shaft.

An electric steering wheel position adjusting device according to an aspect of the present invention includes an electric motor, a feed screw mechanism, and a steering component.

The feed screw mechanism includes a screw shaft having a male threaded portion on an outer peripheral surface, and a nut having an inner peripheral surface with a female threaded portion that engages with the male threaded portion and is configured such that the screw shaft and the nut are relatively displaceable in an axial direction based on relative rotation of the screw shaft and the nut by a rotational force transmitted from the electric motor.

The steering component is fixed to a steering wheel in use and is displaceable in a position adjustment direction of the steering wheel as the screw shaft and the nut are displaced relative to each other in the axial direction.

The screw shaft is configured by the screw shaft of the present invention.

Advantageous Effects of Invention

According to one aspect of the present invention, a screw shaft in which shape accuracy of a male threaded portion is sufficiently ensured, a manufacturing method of the screw shaft, and an electric steering wheel position adjusting device which includes an electric motor and a feed screw mechanism and sufficiently ensures an operation performance of the feed screw mechanism are provided.

DESCRIPTION OF EMBODIMENTS

First Example of Embodiment

A first example of an embodiment of the present invention will be described with reference to FIGS. 1 to 9.

(Electric Steering Wheel Position Adjusting Device and Screw Shaft)

Figure 1:
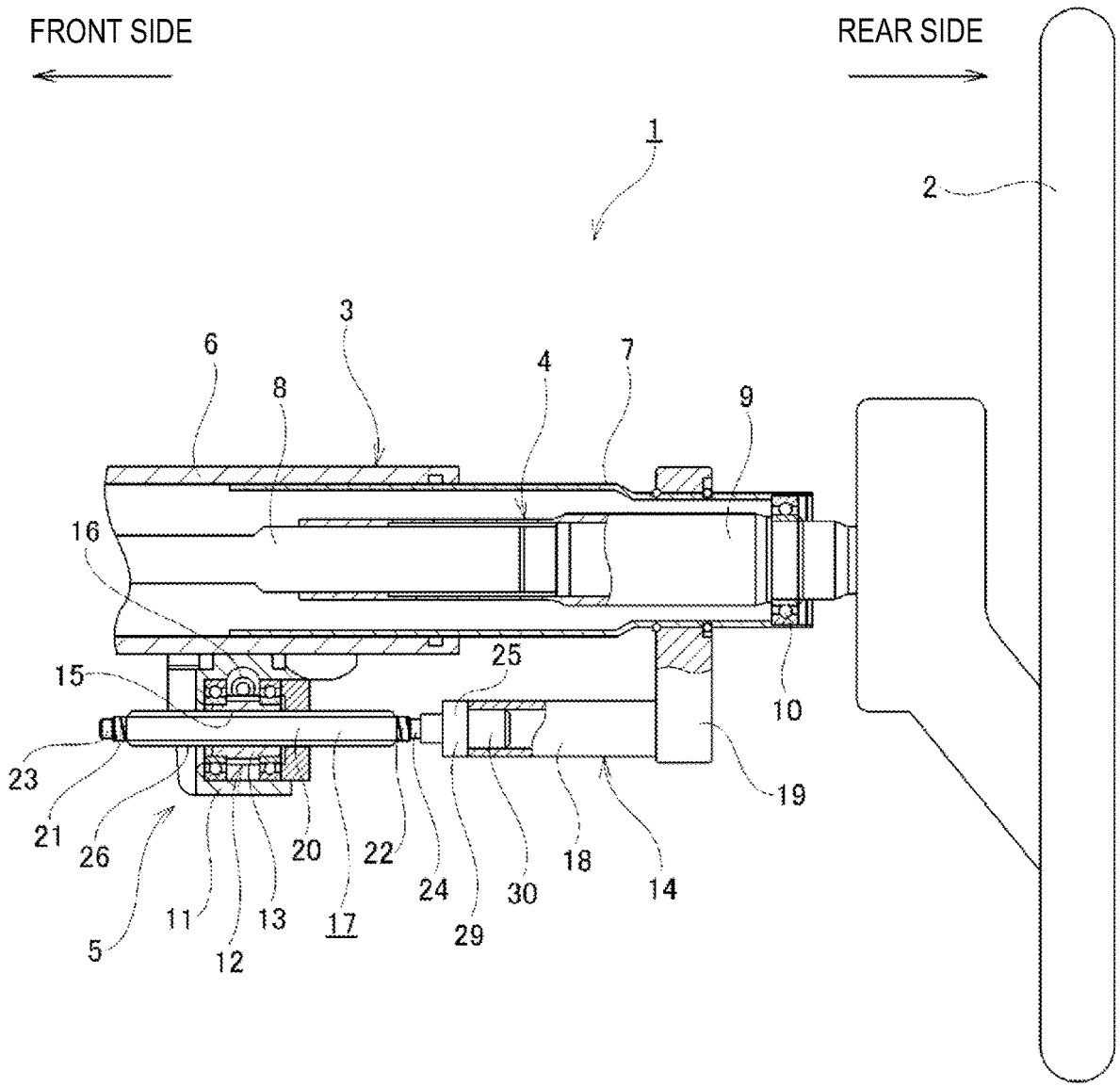
FIG. 1 is a partial cross-sectional view illustrating an electric steering wheel position adjusting device according to a first example of an embodiment of the present invention.
Figure 2A:
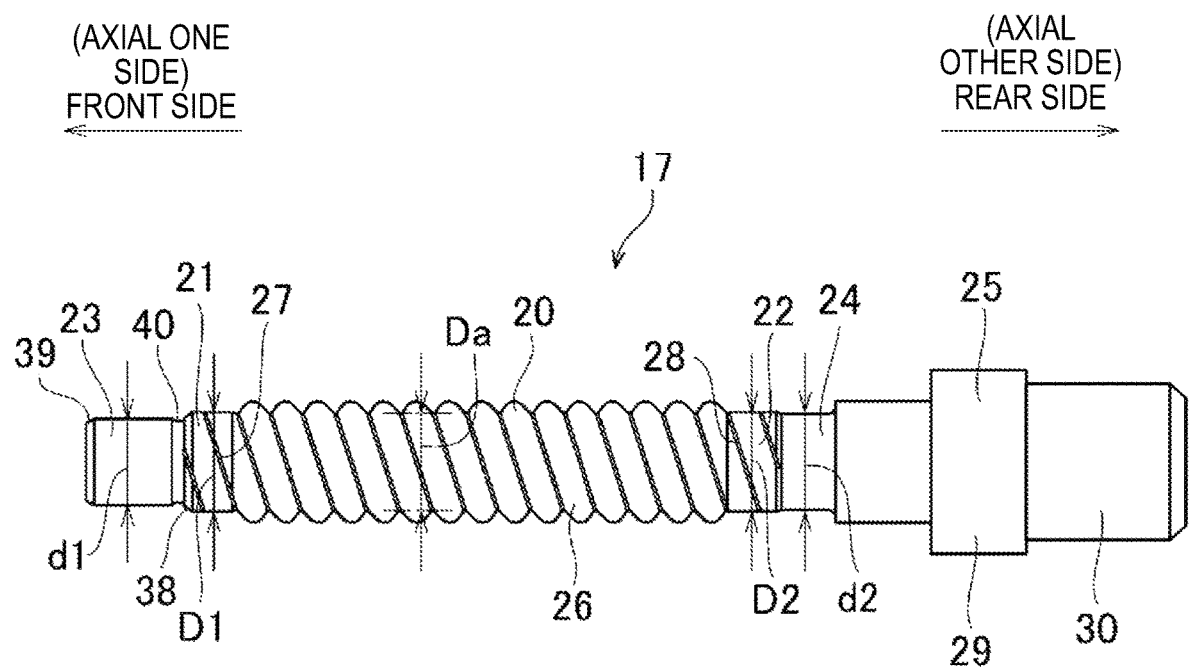
FIG. 2A is a side view of a screw shaft according to the first example of the embodiment of the present invention.
Figure 2B:
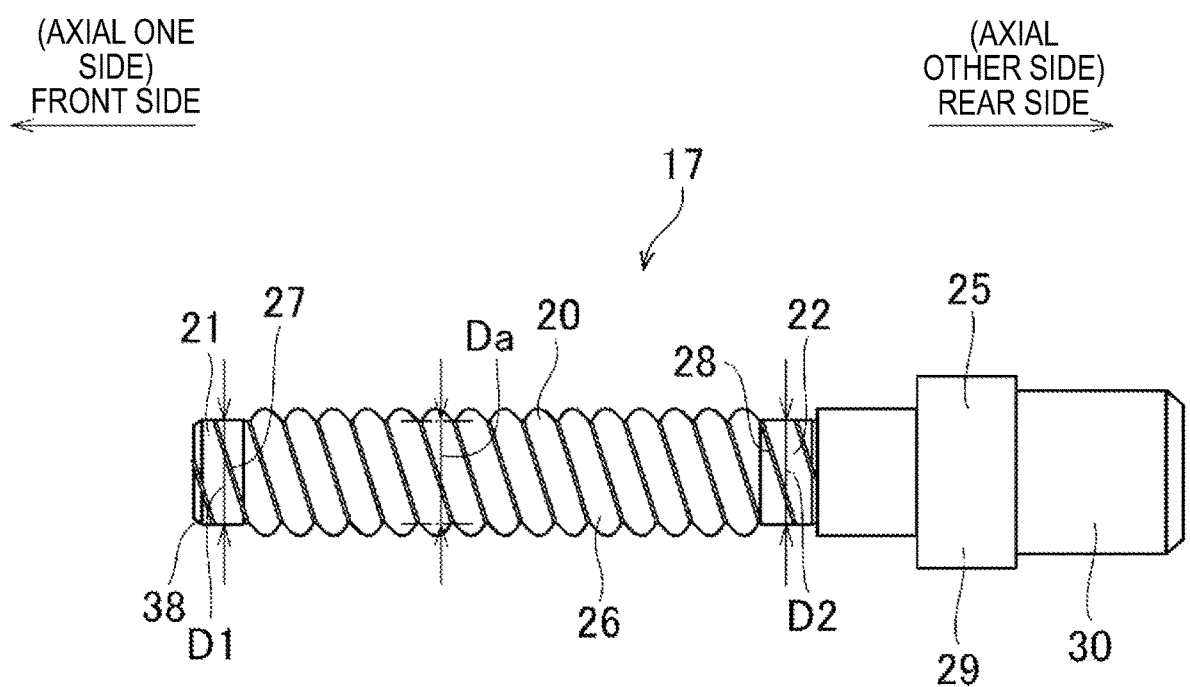
FIG. 2B is a side view of a screw shaft according to another example of the embodiment of the present invention.

FIG. 1 illustrates an electric steering wheel position adjusting device 1 using a screw shaft 17 (FIG. 2A) of this example. Regarding the electric steering wheel position adjusting device 1, a front-rear direction means a front-rear direction of a vehicle in which the device 1 is assembled, the front side being left sides in FIGS. 1 and 2A and the rear side being the right sides in FIGS. 1 and 2A. Further, the electric steering wheel position adjusting device 1 of this example can adjust a longitudinal position of a steering wheel 2 by using an electric motor (not illustrated) as a drive source. FIG. 1 illustrates a state in which the steering wheel 2 is positioned in a middle portion in a longitudinal position adjustment range.

The electric steering wheel position adjusting device 1 of the present invention can be formed of a steering column 3, a steering shaft 4, and an electric actuator 5. The electric steering wheel position adjusting device 1 of the present invention includes at least an electric motor (not illustrated) and a feed screw mechanism 12 that form the electric actuator 5, and an outer tube 9 that forms the steering shaft 4 and corresponds to a steering component.

The steering column 3 includes an outer column 6 on a front side and an inner column 7 on a rear side. The outer column 6 is prevented from axially displacing with respect to a vehicle body. The inner column 7 has its front side portion slidably inserted into an inner diameter side of a rear side portion of the outer column 6.

The steering shaft 4 includes an inner shaft 8 on the front side and the outer tube 9 on the rear side. The inner shaft 8 and the outer tube 9 are combined by spline engagement or the like to enable transmission of torque and relative displacement in an axial direction. The inner shaft 8 is rotatably supported on an inner diameter side of the outer column 6 via a bearing (not illustrated). The outer tube 9 is rotatably supported on an inner diameter side of the inner column 7 via a bearing 10. With such a configuration, the steering shaft 4 is rotatably supported on an inner diameter side of the steering column 3. Along with this, the inner column 7 and the outer tube 9 are axially displaceable relative to the outer column 6 and the inner shaft 8. The steering wheel 2 is supported and fixed to a rear end portion of the outer tube 9, which is a steering component.

The electric actuator 5 includes a housing 11, the feed screw mechanism 12 of the slide screw type, and an electric motor (not illustrated). The housing 11 is supported and fixed to a lower surface of the outer column 6.

The feed screw mechanism 12 includes a nut 13 and a rod 14. A central axis of the feed screw mechanism 12 is arranged parallel to central axes of the steering shaft 4 and the steering column 3.

The nut 13 has a female threaded portion 15 on its inner peripheral surface. The nut 13 is rotatably supported within the housing 11 so as not to be axially displaceable. The nut 13 is rotationally driven by an electric motor via a worm reduction gear 16.

The rod 14 is formed by combining the screw shaft 17 arranged on the front side and an extension shaft 18 arranged on the rear side.

The screw shaft 17 includes a large-diameter shaft portion 20, a first medium-diameter shaft portion 21 and a second medium-diameter shaft portion 22 corresponding to medium-diameter shaft portions, a first small-diameter shaft portion 23 and a second small-diameter shaft portion 24 corresponding to small-diameter shaft portions, and a base end shaft portion corresponding to an adjacent shaft portion.

The large-diameter shaft portion 20 has a male threaded portion 26 that is threadedly engaged with the female threaded portion 15 over the entire axial length on the outer peripheral surface. The male threaded portion 26 is formed by rolling processing. An axial intermediate portion of the male threaded portion 26 excluding both axial end edge portions is formed of a completely threaded portion having a predetermined thread height. Each of the both axial end edge portions of the male threaded portion 26 is formed of an incompletely threaded portion that does not reach a predetermined thread height.

In particular, in this example, the shape accuracy of the male threaded portion 26 is sufficiently ensured. In other words, in this example, the entire male threaded portion 26, including not only the completely threaded portion but also the incompletely threaded portion, is precisely finished so as to function as a normal threaded portion, that is, to be threadedly engaged with the female threaded portion 15 of the nut 13. That is, a flank surface of the male threaded portion 26 is precisely finished not only at the axial intermediate portion, which is a completely threaded portion, but also at both axial end edge portions, which are incompletely threaded portions. Therefore, in this example, the axial length of the entire male threaded portion 26 corresponds to an effective threaded length. The flank surface is a side surface of the thread, that is, a tooth surface.

The first medium-diameter shaft portion 21 is arranged adjacent to the large-diameter shaft portion 20 on one axial side, which is the front side. The first medium-diameter shaft portion 21 is a columnar portion having an outer diameter smaller than an outer diameter of the large-diameter shaft portion 20. Further, in the present embodiment, an outer peripheral surface of the first medium-diameter shaft portion 21 has a first rolling trace 27 having a helical shape. The first rolling trace 27 may be formed by a rolling die 35 for forming the male threaded portion 26 in rolling processing. The first rolling trace 27 is in phase with an extension line of a helical curve that is a groove bottom line of the male threaded portion 26. In the illustrated example, the first medium-diameter shaft portion 21 has a chamfered portion 38 at one axial end edge portion of the outer peripheral surface.

The second medium-diameter shaft portion 22 is arranged adjacent to the large-diameter shaft portion 20 on the other axial side, which is the rear side. The second medium-diameter shaft portion 22 is a columnar portion having an outer diameter smaller than the outer diameter of the large-diameter shaft portion 20. Further, in this embodiment, the outer peripheral surface of the second medium-diameter shaft portion 22 has a second rolling trace 28 having a helical shape. The second rolling trace 28 may be formed by the rolling die 35 for forming the male threaded portion 26 in the rolling processing. The second rolling trace 28 is in phase with the extension line of the helical curve that is the groove bottom line of the male threaded portion 26.

In this example, an outer diameter D1 of the first medium-diameter shaft portion 21 and an outer diameter D2 of the second medium-diameter shaft portion 22 are equal to each other (D1=D2). However, when carrying out the present invention, the outer diameter D1 of the first medium-diameter shaft portion 21 and the outer diameter D2 of the second medium-diameter shaft portion 22 may be different from each other.

In this example, each of the outer diameter D1 of the first medium-diameter shaft portion 21 and the outer diameter D2 of the second medium-diameter shaft portion 22 is set within a range (difference from groove bottom diameter Da is within a range of +7%) of 0.93 times or more and 1.07 times or less a groove bottom diameter (root diameter) Da of the male threaded portion 26 (0.93 Da≤D1≤1.07 Da, 0.93 Da≤D2≤1.07 Da). However, when carrying out the present invention, when the first rolling trace 27 and the second rolling trace 28 can be formed in the rolling processing, the ranges of the outer diameters D1 and D2 can be set to ranges different from the range of this example.

In this example, the outer diameter D1 of the first medium-diameter shaft portion 21 and the outer diameter D2 of the second medium-diameter shaft portion 22 are each smaller than an inner diameter (inscribed circle diameter of the thread) of the female threaded portion of the nut 13. Therefore, each of the first rolling trace 27 and the second rolling trace 28 does not threadedly engaged with the female threaded portion 15 of the nut 13. That is, each of the first rolling trace 27 and the second rolling trace 28 does not function as a normal threaded portion that is threadedly engaged with the female threaded portion 15 of the nut 13.

The first small-diameter shaft portion 23 is arranged adjacent to the first medium-diameter shaft portion 21 on one axial side, which is the front side. The first small-diameter shaft portion 23 is a columnar portion having an outer diameter smaller than the outer diameter of the first medium-diameter shaft portion 21, and does not have helical rolling traces on its outer peripheral surface. In the illustrated example, the first small-diameter shaft portion 23 has a chamfered portion 39 on one axial end edge portion of its outer peripheral surface and a groove portion 40 on the other axial end edge portion of its outer peripheral surface. A part of the outer peripheral surface of the first small-diameter shaft portion 23, which is the part interposed between the chamfered portion 39 and the groove portion 40 is formed of a cylindrical surface of which the outer diameter does not change in the axial direction.

The second small-diameter shaft portion 24 is arranged adjacent to the second medium-diameter shaft portion 22 on the other axial side, which is the rear side. The second small-diameter shaft portion 24 is a columnar portion having an outer diameter smaller than the outer diameter of the second medium-diameter shaft portion 22, and does not have helical rolling traces on its outer peripheral surface. In the illustrated example, the outer peripheral surface of the second small-diameter shaft portion 24 is formed by a cylindrical surface of which the outer diameter does not change in the axial direction.

In this example, an outer diameter d1 of the first small-diameter shaft portion 23 is smaller than an outer diameter d2 of the second small-diameter shaft portion 24 (d1<d2). However, when carrying out the present invention, the outer diameter d1 of the first small-diameter shaft portion 23 can be made larger than the outer diameter d2 of the second small-diameter shaft portion 24, and the outer diameter d1 of the first small-diameter shaft portion 23 and the outer diameter d2 of the second small-diameter shaft portion 24 can be made equal to each other.

In this example, each of the outer diameter d1 of the first small-diameter shaft portion 23 and the outer diameter d2 of the second small-diameter shaft portion 24 is set in a range (smaller than the groove bottom diameter, within −10% difference from the groove bottom diameter Da) of 0.9 times or more and less than 1.0 times the groove bottom diameter Da of the male threaded portion 26 (0.9 Da≤d1<1.0 Da, 0.9 Da≤d2<1.0 Da). However, when carrying out the present invention, when a chamfered portion 37 of the rolling die 35 does not ride on the outer peripheral surface of the first small-diameter shaft portion 23 and the outer peripheral surface of the second small-diameter shaft portion 24 in the rolling processing, that is, when the rolling traces are not formed on these outer peripheral surfaces, the ranges of the outer diameters d1 and d2 can also be set to ranges different from the ranges in this example.

The base end shaft portion 25 is arranged adjacent to the second small-diameter shaft portion 24 on the other axial side, which is the rear side. The base end shaft portion 25 is a stepped columnar portion having an outer diameter larger than the outer diameters of the second medium-diameter shaft portion 22 and the second small-diameter shaft portion 24 as a whole. The base end shaft portion 25 has a flange portion 29, which projects radially outwardly, in its axial intermediate portion. A part of the base end shaft portion 25, which is the part located on the rear side of the flange portion 29, is formed by a fitting portion 30 having a cylindrical shape.

The extension shaft 18 is cylindrical in shape. A front end portion of the extension shaft 18 is externally fitted and fixed to the fitting portion 30 of the screw shaft 17. A rear end portion of the extension shaft 18 is connected to a rear end portion of the inner column 7 via an arm portion 19.

When adjusting a front-rear position of the steering wheel 2, the nut 13 is driven to rotate via the worm reduction gear 16 by the electric motor, thereby axially displacing the rod 14 with respect to the nut 13. Thereby, by displacing the inner column 7 connected to the rod 14 via the arm portion 19 and the outer tube 9 supported on an inner diameter side of the inner column 7 in the same direction as the rod 14, the front-rear position of the steering wheel 2 is adjusted.

(Manufacturing Method of Screw Shaft)

Figure 3:
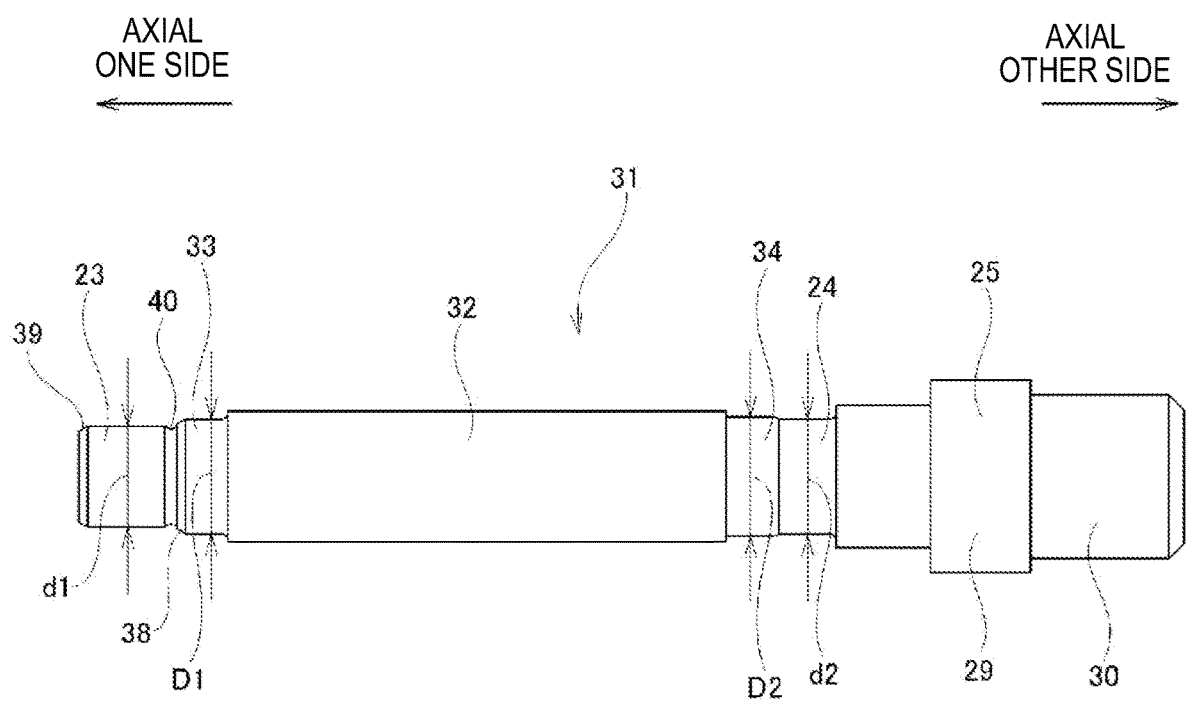
FIG. 3 is a side view of a workpiece that is an intermediate material for the screw shaft according to the first example of the embodiment of the present invention.

A manufacturing method of the screw shaft 17 of the present invention includes performing rolling processing on the workpiece 31 as illustrated in FIG. 3, that is, the workpiece 31 including a large-diameter shaft portion for rolling 32, medium-diameter shaft portions for rolling 33 and 34 which are arranged axially adjacent to the large-diameter shaft portion for rolling 32 and have an outer diameter smaller than the outer diameter of the large-diameter shaft portion for rolling 32, and small-diameter shaft portions 23 and 24 which are respectively arranged adjacent to the medium-diameter shaft portions for rolling 33 and 34 on sides opposite to the large-diameter shaft portion for rolling 32 in the axial direction and have an outer diameter smaller than the outer diameter of the medium-diameter shaft portions for rolling 33 and 34, using a plurality of rolling dies 35, which causes progress in the workpiece 31, in order to form the male threaded portion 26 over the entire axial length on the outer peripheral surface of the large-diameter shaft portion for rolling 32. The rolling processing method of this example is an in-feed method in which the workpiece progresses.

A manufacturing method of the screw shaft 17 of the present invention will be described with reference to FIGS. 3 to 9. In the screw shaft 17, which is a manufacturing target in this example, each of the outer diameter D1 of the first medium-diameter shaft portion 21 and the outer diameter D2 of the second medium-diameter shaft portion 22 is set within a range of 0.93 times or more and 1.07 times or less the groove bottom diameter Da of the male threaded portion 26. In addition, each of the outer diameter d1 of the first small-diameter shaft portion 23 and the outer diameter d2 of the second small-diameter shaft portion 24 is set within a range of 0.9 times or more and less than 1.0 times the groove bottom diameter Da of the male threaded portion 26. In the following description, unless otherwise specified, the axial direction means the axial direction of the workpiece 31 which is an intermediate material of the screw shaft 17. Further, the one axial side is the left side in FIGS. 3 to 9, and the other axial side is the right side in FIGS. 3 to 9.

FIG. 3 illustrates the workpiece 31. The workpiece 31 has a shape other than the male threaded portion 26, the first rolling trace 27, and the second rolling trace 28 of the screw shaft 17 (see FIG. 2A). That is, the workpiece 31 includes the large-diameter shaft portion for rolling 32 having the male threaded portion 26 formed on its outer peripheral surface, the first medium-diameter shaft portion for rolling 33 having the first rolling trace 27 formed on its outer peripheral surface, the second medium-diameter shaft portion for rolling 34 having the second rolling trace 28 formed on its outer peripheral surface, the first small-diameter shaft portion 23, the second small-diameter shaft portion 24, and the base end shaft portion 25.

In the illustrated example, the outer peripheral surface of the large-diameter shaft portion for rolling 32 is formed by a cylindrical surface of which the outer diameter does not change in the axial direction.

The first medium-diameter shaft portion for rolling 33 is arranged adjacent to one axial side of the large-diameter shaft portion for rolling 32 and has an outer diameter smaller than the outer diameter of the large-diameter shaft portion for rolling 32. In the illustrated example, the outer peripheral surface of the first medium-diameter shaft portion for rolling 33 is formed of a cylindrical surface of which the outer diameter does not change in the axial direction, except for the chamfered portion 38 formed at one axial end edge portion. The outer diameter of the first medium-diameter shaft portion for rolling 33 is set to D1, the same as the outer diameter of the first medium-diameter shaft portion 21 (see FIG. 2A).

The second medium-diameter shaft portion for rolling 34 is arranged adjacent to the other axial side of the large-diameter shaft portion for rolling 32, and has an outer diameter smaller than the outer diameter of the large-diameter shaft portion for rolling 32. In the illustrated example, the outer peripheral surface of the second medium-diameter shaft portion for rolling 34 is formed of a cylindrical surface of which the outer diameter does not change in the axial direction. The outer diameter of the second medium-diameter shaft portion for rolling 34 is set to D2, the same as the outer diameter of the second medium-diameter shaft portion 22 (see FIG. 2A).

The first small-diameter shaft portion 23 is arranged adjacent to one axial side of the first medium-diameter shaft portion for rolling 33, and has an outer diameter smaller than the outer diameter of the first medium-diameter shaft portion for rolling 33.

The second small-diameter shaft portion 24 is arranged adjacent to the other axial side of the second medium-diameter shaft portion for rolling 34, and has an outer diameter smaller than the outer diameter of the second medium-diameter shaft portion for rolling 34.

The base end shaft portion 25 is arranged adjacent to the other axial side of the second small-diameter shaft portion 24.

Figure 4:
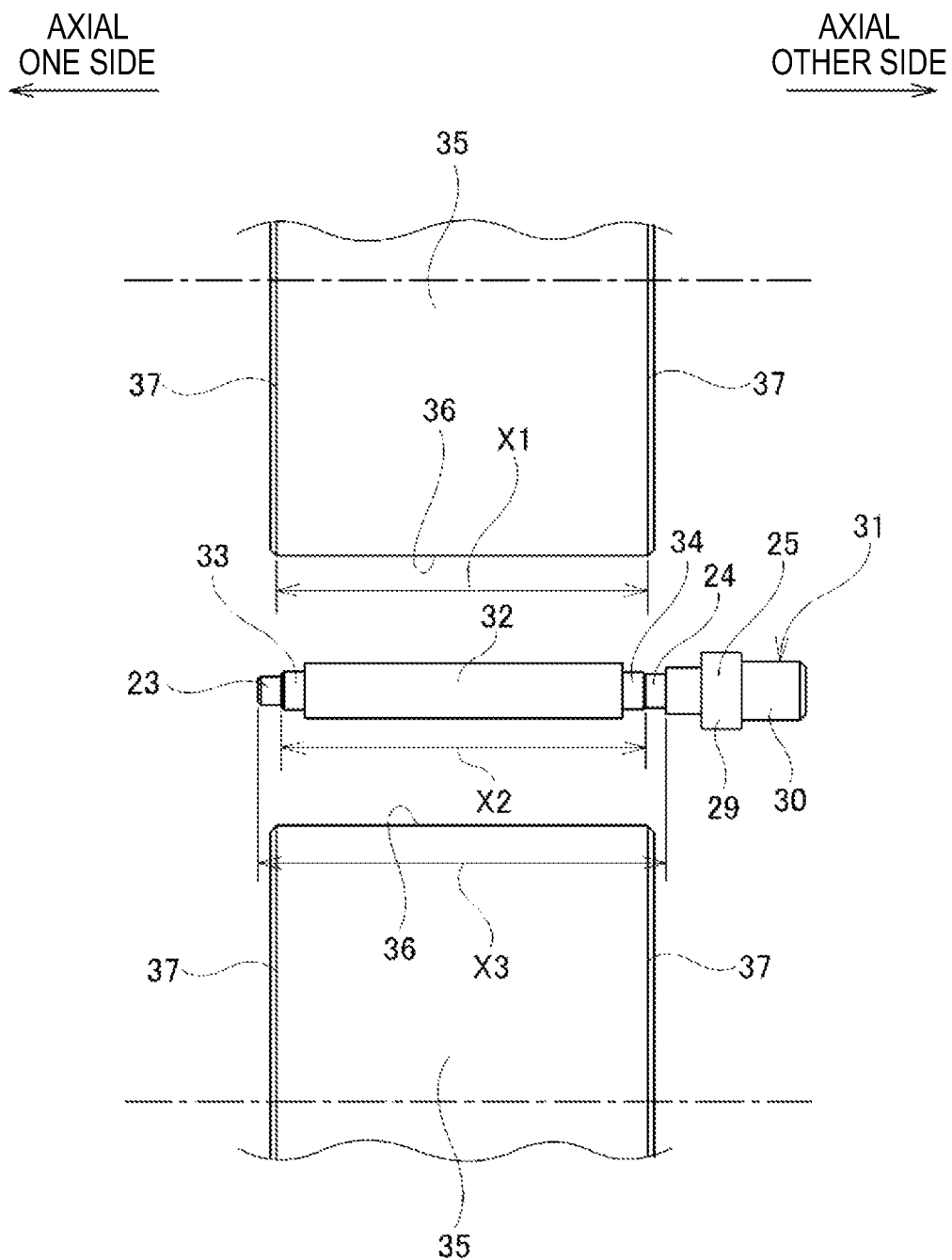
FIG. 4 is a diagram illustrating a state in which the workpiece is set in a rolling machine according the first example of the embodiment of the present invention.

When rolling the workpiece 31 to obtain the screw shaft 17, first, as illustrated in FIG. 4, the workpiece 31 is set on a rolling machine.

The rolling machine includes a pair of rolling dies 35. The pair of rolling dies 35 are round dies each having a short cylindrical shape, and are arranged parallel to each other with their outer peripheral surfaces facing each other.

Each of the rolling dies 35 has helical rolling teeth 36 (refer to FIGS. 6 and 9, and illustration of the shape is omitted in FIGS. 4, 5, 7, 8A and 8B) for rolling the male threaded portion 26 on the outer peripheral surface, and each of the rolling dies 35 has chamfered portions 37 at respective locations adjacent to both axial sides of the rolling teeth 36. That is, each of the rolling dies 35 has the rolling teeth 36 in an axial intermediate portion of the outer peripheral surface, and has the chamfered portions 37 at respective end portions on both axial sides of the outer peripheral surface.

Each of the chamfered portions 37 is formed of an inclined surface that is inclined toward an axial center side of the rolling die 35 as it goes radially outward. As illustrated enlarged in FIGS. 6 and 9, the diameter of a small-diameter side end portion of the chamfered portion 37 is approximately equal to a tooth bottom diameter of the rolling tooth 36. In addition, the chamfered portion 37 is provided to relieve stress concentration during rolling processing. In addition, in the illustrated example, the chamfered portion 37 has a linear cross-sectional shape, but in carrying out the present invention, the cross-sectional shape of the chamfered portion of the rolling die may be a convex circular arc shape.

Also, in this example, an axial dimension X1 of the rolling teeth 36, in other words, an interval (X1) between the pair of chamfered portions 37 is set to be larger than an axial dimension X2 from one axial end edge of the first medium-diameter shaft portion for rolling 33 of the workpiece 31 to the other axial end edge of the second medium-diameter shaft portion for rolling 34 (X1>X2). Also, in this example, the axial dimension X1 of the rolling teeth 36 is smaller than an axial dimension X3 from one axial end edge of the first small-diameter shaft portion 23 of the workpiece 31 to the other axial end edge of the second small-diameter shaft portion 24 (X1<X3). However, when carrying out the present invention, when the chamfered portions 37 on the other axial sides of the pair of rolling dies 35 can be maintained at the same axial positions as the second small-diameter shaft portion 24 during rolling processing, depending on a support method of the workpiece 31 on the first small-diameter shaft portion 23 side, that is, by adopting a support method that avoids interference between a support member of the workpiece 31 on the first small-diameter shaft portion 23 side and the pair of rolling dies 35, a configuration in which X1≥X3 can also be adopted.

At a stage of setting the workpiece 31 on the rolling machine as illustrated in FIG. 4, a distance between the outer peripheral surfaces (addendum circle of each rolling tooth 36 of the rolling dies 35) of the pair of rolling dies 35 is sufficiently larger than the outer diameter of the large-diameter shaft portion for rolling 32 of the workpiece 31. In a state where the workpiece 31 is set on the rolling machine, the workpiece 31 is arranged parallel to the pair of rolling dies 35 at a central position between the outer peripheral surfaces of the pair of rolling dies 35.

In this state, the rolling teeth 36 of the pair of rolling dies 35 face outer peripheral surfaces of the large-diameter shaft portion for rolling 32, the first medium-diameter shaft portion for rolling 33, and the second medium-diameter shaft portion for rolling 34 of the workpiece 31. Also, the chamfered portions 37 on one axial sides of the pair of rolling dies 35 face the outer peripheral surface of the first small-diameter shaft portion 23 of the workpiece 31, and the chamfered portions 37 on the other axial sides of the pair of rolling dies 35 face the outer peripheral surface of the second small-diameter shaft portion 24 of the workpiece 31.

Figure 5:
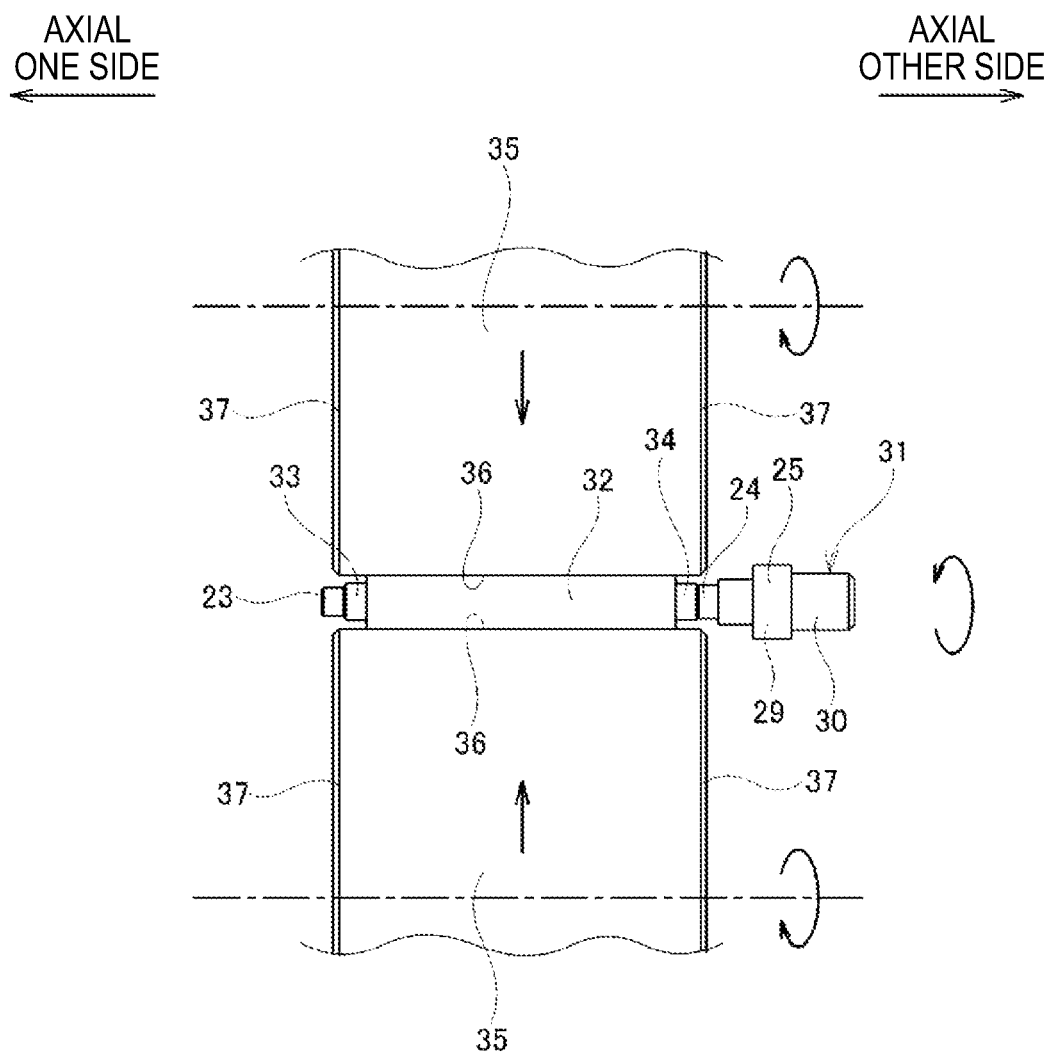
FIG. 5 is a diagram illustrating a state in which a distance between a pair of rolling dies rotating in a normal direction is narrowed and the rolling die is pressed against a large-diameter shaft portion for rolling of the workpiece to start rolling processing, in relation to the first example of the embodiment of the present invention.
Figure 6:
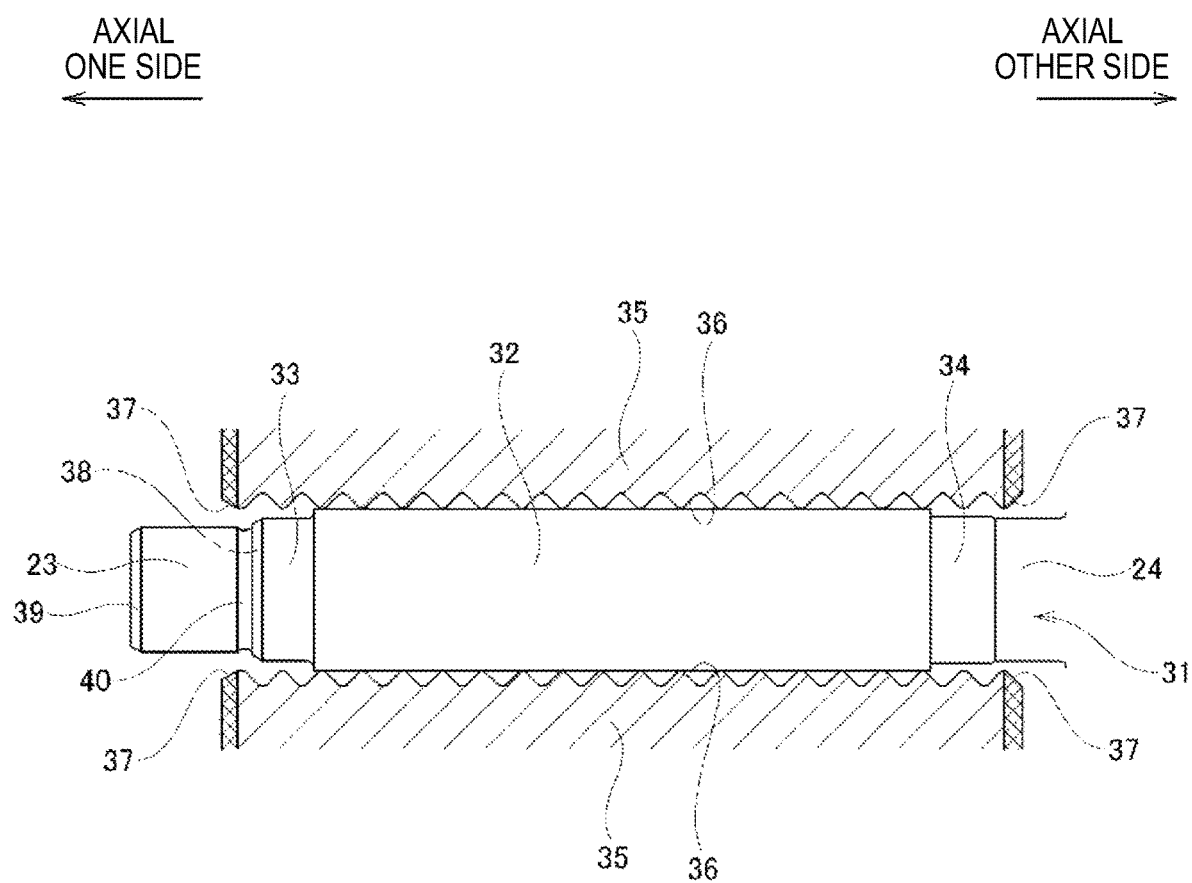
FIG. 6 is a partially enlarged cross-sectional view of FIG. 5.

Next, while rotating the pair of rolling dies 35 in the same direction, the distance between the pair of rolling dies 35 is narrowed. As illustrated in FIGS. 5 and 6, cutting, which is processing of making the rolling teeth 36 of the pair of rolling dies 35 bite into the outer peripheral surface of the large-diameter shaft portion for rolling 32 of the workpiece 31, is started. When the cutting is started, the workpiece 31 is given rotational force from the pair of rolling dies 35 and rotates in an opposite direction to the pair of rolling dies 35. As a result, the entire circumference of the outer peripheral surface of the large-diameter shaft portion for rolling 32 of the workpiece 31 is rolled, and the male threaded portion 26 is gradually formed.

In the rolling processing of this example, as the cutting progresses, based on a lead angle error that occurs between the rolling teeth 36 of the pair of rolling dies 35 and the large-diameter shaft portion for rolling 32 of the workpiece 31, progress occurs, which is a phenomenon in which the workpiece 31 moves in the axial direction with respect to the pair of rolling dies 35.

Figure 7A:
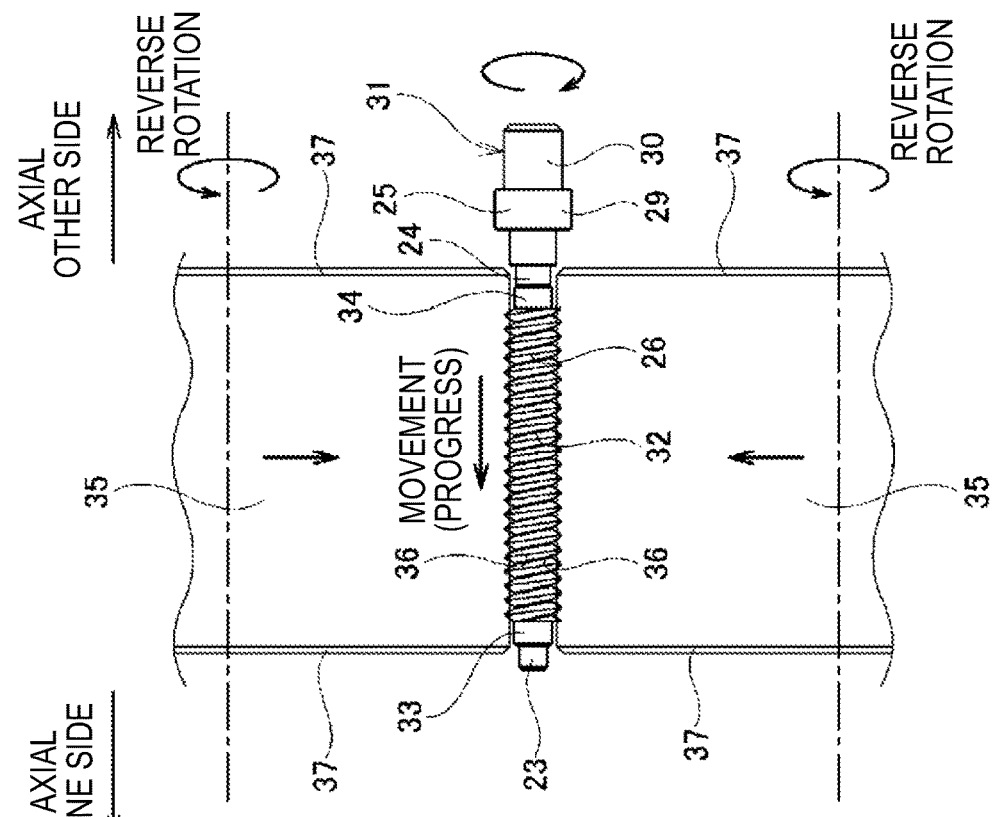
FIG. 7A is a diagram illustrating a state in which the workpiece progresses from one axial side to an end of the other axial side as the pair of rolling dies rotates in the normal direction in the middle of the rolling processing, in relation to the first example of the embodiment of the present invention.
Figure 7B:
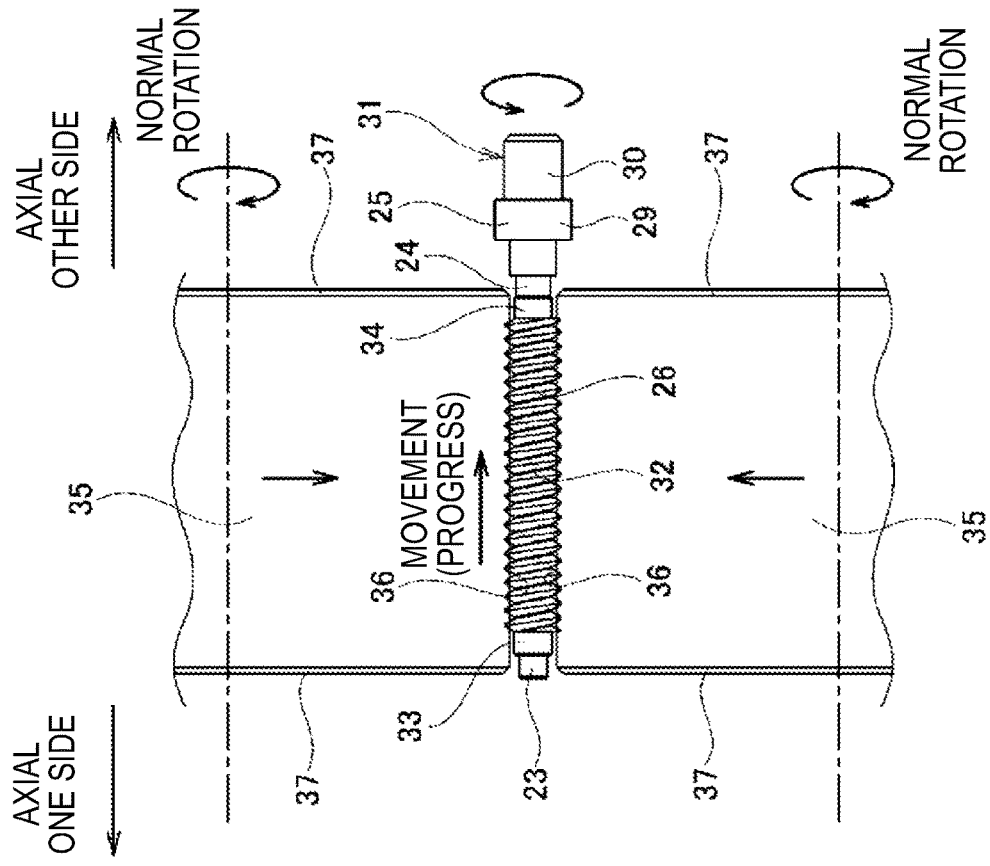
FIG. 7B is a diagram illustrating a state in which the workpiece progresses from the other axial side to an end of the one axial side as the pair of rolling dies rotates in a reverse direction in the middle of the rolling processing.

In this example, the pair of rolling dies 35 are alternately rotated in the normal direction, which is a rotation direction at the start of cutting, and in the reverse direction, which is an opposite direction, by NC control. Therefore, the workpiece 31 is subjected to the rolling processing while reciprocating in the axial direction between the pair of rolling dies 35. Specifically, when the pair of rolling dies 35 rotate in the normal direction, the workpiece 31 moves to the other axial side as illustrated in FIG. 7A, and when the pair of rolling dies 35 rotate in the reverse direction, the workpiece 31 moves to one axial side as illustrated in FIG. 7B. The workpiece 31 is subjected to rolling processing while the movement of the workpiece 31 to the other axial side and the movement to the one axial side are alternately repeated.

In this example, the movement of the workpiece 31 to the other axial side is stopped at the axial position illustrated in FIG. 7A by the NC control. The axial position illustrated in FIG. 7A is an axial position where an axial central portion of the large-diameter shaft portion for rolling 32 of the workpiece 31 is located further on the other axial side than axial central portions of the rolling teeth 36 of the pair of rolling dies 35. In particular, in this example, even at the axial position illustrated in FIG. 7A, a state where the chamfered portions 37 on one axial sides of the pair of rolling dies 35 face the outer peripheral surface of the first small-diameter shaft portion 23 of the workpiece 31, and the chamfered portions 37 on the other axial sides of the pair of rolling dies 35 face the outer peripheral surface of the second small-diameter shaft portion 24 of the workpiece 31 is maintained. That is, as the workpiece 31 moves to the other axial side, the chamfered portions 37 on the other axial sides of the pair of rolling dies 35 do not move in the axial direction to the position where the chamfered portions 37 face the outer peripheral surface of the second medium-diameter shaft portion for rolling 34.

Similarly, the movement of the workpiece 31 to one axial side is stopped at the axial position illustrated in FIG. 7B. The axial position illustrated in FIG. 7B is an axial position where the axial central portion of the large-diameter shaft portion for rolling 32 of the workpiece 31 is located further on the one axial side than the axial central portions of the rolling teeth 36 of the pair of rolling dies 35. In particular, in this example, even at the axial position, a state where the chamfered portions 37 on one axial sides of the pair of rolling dies 35 face the outer peripheral surface of the first small-diameter shaft portion 23 of the workpiece 31, and the chamfered portions 37 on the other axial sides of the pair of rolling dies 35 face the outer peripheral surface of the second small-diameter shaft portion 24 of the workpiece 31 is maintained. That is, as the workpiece 31 moves to the one axial side, the chamfered portions 37 on the other axial sides of the pair of rolling dies 35 do not move in the axial direction to the position where the chamfered portions 37 face the outer peripheral surface of the first medium-diameter shaft portion for rolling 33. Further, at the axial position illustrated in FIG. 7B, each of the pair of rolling dies 35 is located further on one axial side than the base end shaft portion of the workpiece 31 and does not collide with the base end shaft portion 25.

Figure 8A:
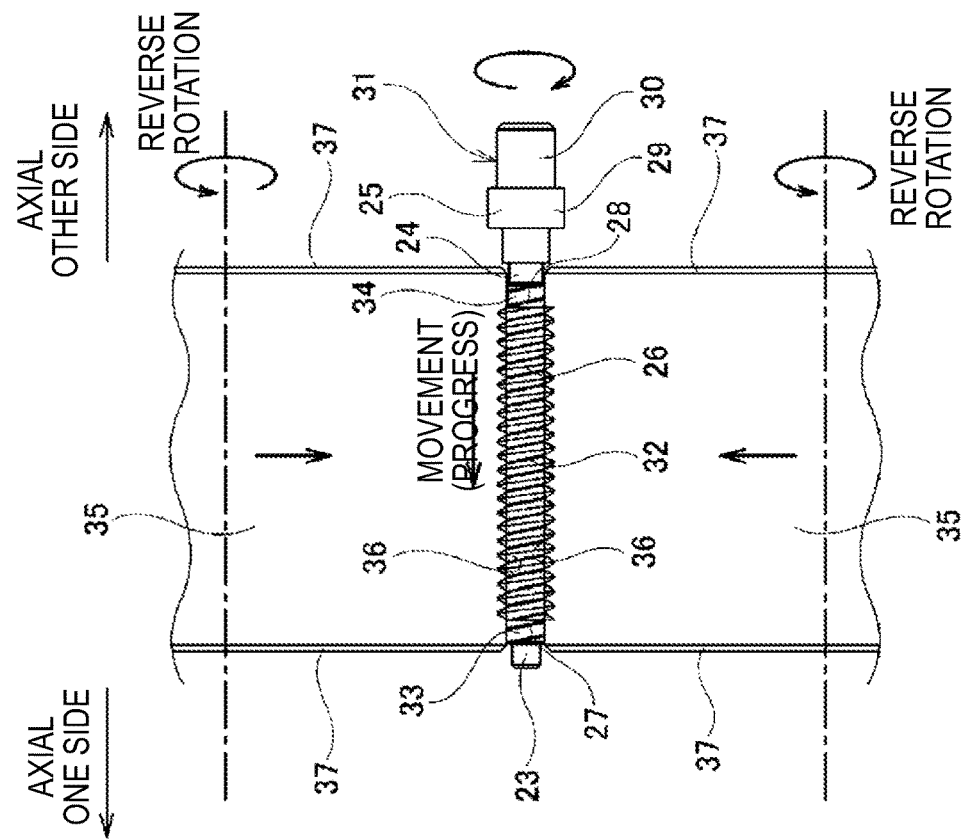
FIG. 8A is a diagram illustrating a state in which, in a final stage of the rolling processing, the workpiece progresses from the one axial side to the end of the other axial side as the pair of rolling dies rotates in the normal direction, and a rolling trace is formed on an outer peripheral surface of a medium-diameter shaft portion for rolling on the one axial side of the workpiece, in relation to the first example of the embodiment of the present invention.
Figure 8B:
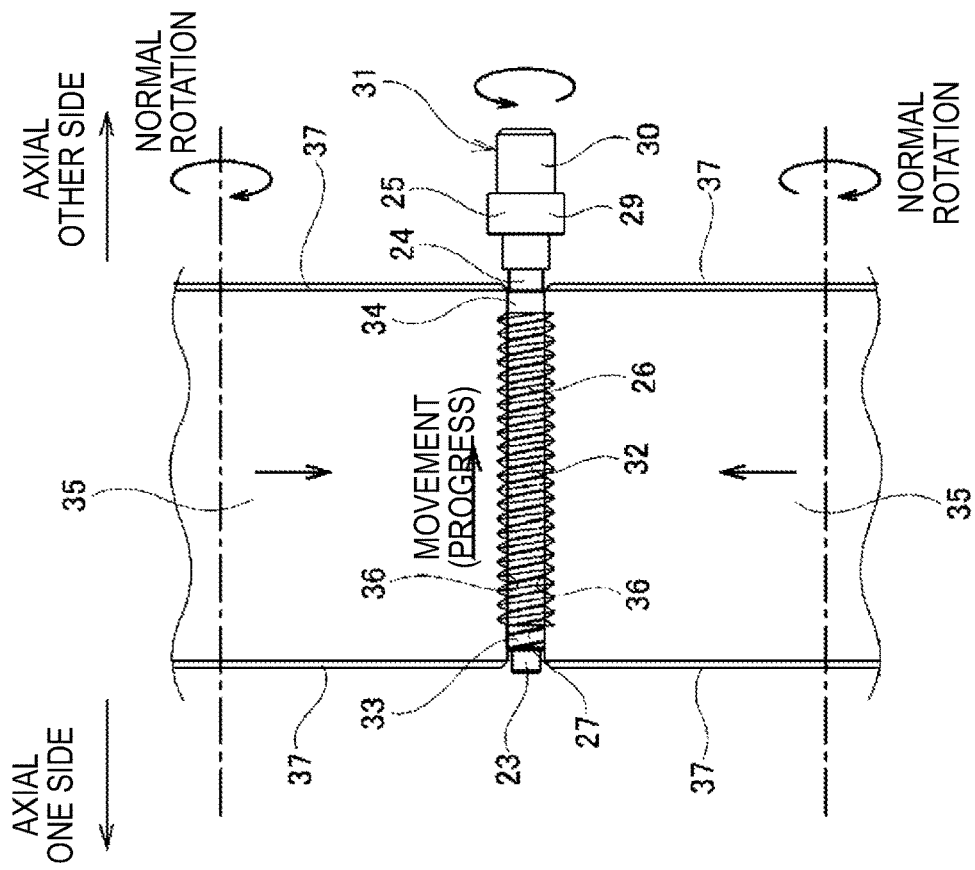
FIG. 8B is a diagram illustrating a state in which, in the final stage of the rolling processing, the workpiece progresses from the other axial side to an end of the one axial side as the pair of rolling dies rotates in the reverse direction, and a rolling trace is formed on an outer peripheral surface of a small-diameter shaft portion for rolling on the other axial side of the workpiece.
Figure 9:
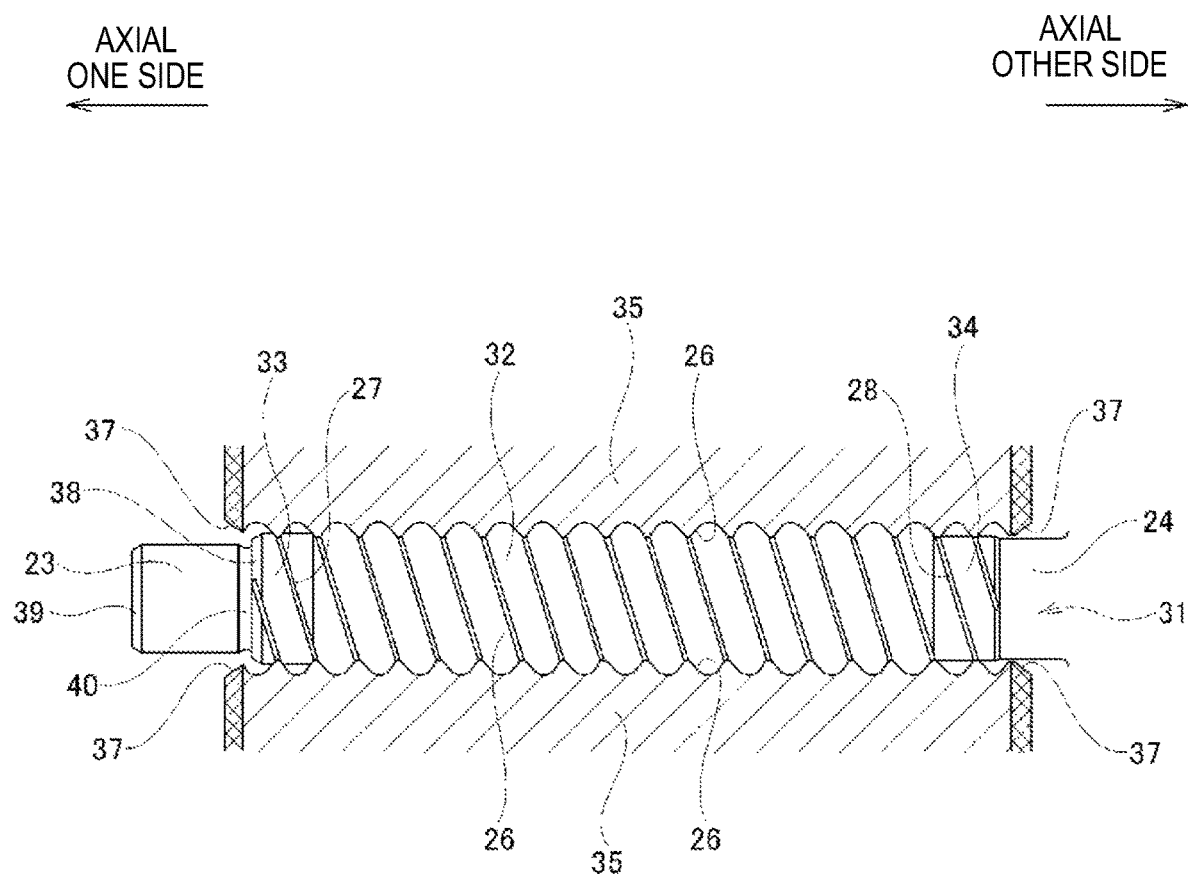
FIG. 9 is a partially enlarged cross-sectional view of FIG. 8B.

In this example, the step of cutting is performed until, as illustrated in FIG. 8A, rolling processing for forming the male threaded portion 26 on the outer peripheral surface of the large-diameter shaft portion for rolling 32 is performed by the rolling teeth 36 of the pair of rolling dies 35, and at the same time, the first rolling trace 27 having a helical shape is formed on the outer peripheral surface of the first medium-diameter shaft portion for rolling 33, and as illustrated in FIG. 8B, rolling processing for forming the male threaded portion 26 on the outer peripheral surface of the large-diameter shaft portion for rolling 32 is performed by the rolling teeth 36 of the pair of rolling dies 35, and at the same time, the second rolling trace 28 having a helical shape is formed on the outer peripheral surface of the second medium-diameter shaft portion for rolling 34. FIG. 9 illustrates a partially enlarged cross-sectional view of FIG. 8B. In this example, since the first rolling trace 27 and the second rolling trace 28 are formed as described above, each of the first rolling trace 27 and the second rolling trace 28 becomes a helical trace in phase with the extension line of the helical curve that is the groove bottom line of the male threaded portion 26.

Also, in this example, from the start to the end of the cutting step, a state is maintained in which the chamfered portions 37 on one axial sides of the pair of rolling dies 35 face the outer peripheral surface of the first small-diameter shaft portion 23 of the workpiece 31 with a gap, or are in contact with the outer peripheral surface to the extent that the chamfered portions 37 do not ride on the outer peripheral surface, that is, to the extent that rolling traces are not formed on the outer peripheral surface, and also the chamfered portions 37 on the other axial sides of the pair of rolling dies 35 face the outer peripheral surface of the second small-diameter shaft portion 24 of the workpiece 31 with a gap, or are in contact with the outer peripheral surface to the extent that the chamfered portions 37 do not ride on the outer peripheral surface, that is, to the extent that rolling traces are not formed on the outer peripheral surface. Conversely, in this example, each of the outer diameter d1 of the first small-diameter shaft portion 23 and the outer diameter d2 of the second small-diameter shaft portion 24 is set to be less than 1.0 times the groove bottom diameter Da of the male threaded portion 26, so that such a state is maintained.

When each of the outer diameter D1 of the first medium-diameter shaft portion for rolling 33 and the outer diameter D2 of the second medium-diameter shaft portion for rolling 34 is equal to or greater than the groove bottom diameter Da of the male threaded portion 26, each of the first rolling trace 27 and the second rolling trace 28 becomes a helical trace formed continuously with the male threaded portion 26. On the other hand, when the outer diameter D1 of the first medium-diameter shaft portion for rolling 33 and the outer diameter D2 of the second medium-diameter shaft portion for rolling 34 are somewhat smaller than the groove bottom diameter Da of the male threaded portion 26, when the rolling processing is performed, the pair of rolling dies 35 are not sufficiently supported by the first medium-diameter shaft portion for rolling 33 and the second medium-diameter shaft portion for rolling 34. Therefore, shaking, bending, breakage, or the like of the shaft may occur, resulting in discontinuity between each of the first rolling trace 27 and the second rolling trace 28 and the male threaded portion 26.

After completing the cutting step, the gap between the pair of rolling dies 35 is widened, and the completed screw shaft 17 is removed from the rolling machine.

According to the manufacturing method of the screw shaft 17 of this example, the shape accuracy of the male threaded portion 26 can be sufficiently secured, and the flank surface of the male threaded portion 26 can be precisely finished not only at the axial intermediate portion, which is a completely threaded portion, but also at both axial end edge portions, which are incompletely threaded portions. This point will be specifically described below.

In this example, after starting the cutting step, at first, as illustrated in FIGS. 7A and 7B, in a state where the rolling teeth 36 of the pair of rolling dies 35 are in contact only with the outer peripheral surface of the large-diameter shaft portion for rolling 32 of the workpiece 31, the rolling processing for forming the male threaded portion 26 is performed.

In this case, when, as illustrated in FIG. 7A, the axial central portion of the large-diameter shaft portion for rolling 32 of the workpiece 31 is located further on the other axial side than the axial central portions of the rolling teeth 36 of the pair of rolling dies 35 due to the progress of the workpiece 31, or when, as illustrated in FIG. 7B, the axial central portion of the large-diameter shaft portion for rolling 32 of the workpiece 31 is located further on one axial side than the axial central portions of the rolling teeth 36 of the pair of rolling dies 35 due to the progress of the workpiece 31, axial distribution of a rolling load acting between the pair of rolling dies 35 and the workpiece 31 is uneven. Then, an amount of elastic deformation of the rolling machine supporting the pair of rolling dies 35 and the workpiece 31 changes due to the uneven axial distribution of the rolling load, and thus relative displacement such as tilting tends to occur between the pair of rolling dies 35 and the workpiece 31. As a result, machining accuracy of both end portions in the axial direction of the male threaded portion 26 during machining is low.

However, at the final stage of the cutting step, as illustrated in FIGS. 8A and 8B, the rolling teeth 36 of the pair of rolling dies 35 are in contact with not only the outer peripheral surface of the large-diameter shaft portion for rolling 32 but also the outer peripheral surfaces of the first medium-diameter shaft portion for rolling 33 and the second medium-diameter shaft portion for rolling 34. In this case, one axial end portions of the rolling teeth 36 of the pair of rolling dies 35 are in contact with and supported by the outer peripheral surface of the first medium-diameter shaft portion for rolling 33, and the other axial end portions of the rolling teeth 36 of the pair of rolling dies 35 are in contact with and supported by the outer peripheral surface of the second medium-diameter shaft portion for rolling 34. Therefore, it is possible to prevent the axial distribution of the rolling load acting between the pair of rolling dies 35 and the workpiece 31 from becoming largely unbalanced. Therefore, at the final stage of the cutting step, the change in the amount of elastic deformation of the rolling machine supporting the pair of rolling dies 35 and the workpiece 31 can be sufficiently suppressed. Therefore, relative displacement such as inclination between the pair of rolling dies 35 and the workpiece 31 can be prevented from occurring. As a result, in the final stage of the cutting step, both end portions of the male threaded portion 26 in the axial direction can be machined with good accuracy. That is, the flank surface of the male threaded portion 26 can be precisely finished not only at the axial intermediate portion, which is a completely threaded portion, but also at both axial end edge portions, which are incompletely threaded portions.

Further, in this example, from the start to the end of the cutting step, a state is maintained in which the chamfered portions 37 on one axial sides of the pair of rolling dies 35 face the outer peripheral surface of the first small-diameter shaft portion 23 of the workpiece 31 with a gap therebetween, or are in contact with the outer peripheral surface to such an extent that the chamfered portions 37 do not ride on the outer peripheral surface, and the chamfered portions 37 on the other axial sides of the pair of rolling dies 35 face the outer peripheral surface of the second small-diameter shaft portion 24 of the workpiece 31 with a gap therebetween, or are in contact with the outer peripheral surface to such an extent that the chamfered portions 37 do not ride on the outer peripheral surface. That is, in this example, an inclined surface forming the chamfered portion 37 does not ride on the outer peripheral surface of the workpiece 31 from the start to the end of the cutting step. Therefore, a situation in which when the inclined surface rides on the outer peripheral surface of the workpiece 31, a large load directed radially inward and axially opposite to the central portion of the rolling die 35 is applied to this riding portion does not occur. Therefore, it is possible to avoid a problem that due to the occurrence of such a situation, excessive elongation or twisting occurs in the workpiece 31 starting from a portion of the outer peripheral surface of the workpiece 31 on which the inclined surface rides, and thus shape errors of the male threaded portion 26 such as tooth profile error, tooth trace error, screw pitch error, and the like occur, and the shape accuracy of the male threaded portion 26 decreases. In addition, it is possible to avoid radial burrs and bulges at the one axial end portion of the first medium-diameter shaft portion 21 and the one axial end portion of the second medium-diameter shaft portion 22. Therefore, from such an aspect as well, the shape accuracy of the male threaded portion 26 can be sufficiently ensured.

In addition, when carrying out the present invention, when the outer diameter D1 of the first medium-diameter shaft portion for rolling 33 and the outer diameter D2 of the second medium-diameter shaft portion for rolling 34 are smaller than the groove bottom diameter Da of the male threaded portion 26, if these outer diameters D1 and D2 are made extremely small, in a state illustrated in FIGS. 8A and 8B, relative displacement such as inclination between the pair of rolling dies 35 and the workpiece 31 cannot be sufficiently suppressed. In this example, in order to avoid such inconvenience, when the outer diameter D1 of the first medium-diameter shaft portion for rolling 33 and the outer diameter D2 of the second medium-diameter shaft portion for rolling 34 are smaller than the groove bottom diameter Da of the male threaded portion 26, these outer diameters D1 and D2 are set to 0.93 times or more the groove bottom diameter Da of the male threaded portion 26.

In this example, when the outer diameter D1 of the first medium-diameter shaft portion for rolling 33 and the outer diameter D2 of the second medium-diameter shaft portion for rolling 34 are larger than the groove bottom diameter Da of the male threaded portion 26, the reason why these outer diameters D1 and D2 are 1.07 times or less the groove bottom diameter Da of the male threaded portion 26 is that each of the first rolling trace 27 and the second rolling trace 28 should not be threadedly engaged with the female threaded portion 15 of the nut 13, that is, not be an effective threaded portion. In other words, when the outer diameters D1 and D2 are larger than 1.07 times the groove bottom diameter Da of the male threaded portion 26, there is a possibility that each of the first rolling trace 27 and the second rolling trace 28 having poor shape accuracy as a threaded portion will be screwed together with the female threaded portion of the nut 13. Therefore, in order to avoid such a possibility, the outer diameters D1 and D2 are set to 1.07 times or less the groove bottom diameter Da of the male threaded portion 26.

In this example, when performing rolling processing for forming the male threaded portion 26, each of the outer diameter d1 of the first small-diameter shaft portion 23 and the outer diameter d2 of the second small-diameter shaft portion 24 needs to be reduced to the extent that the chamfered portion 37 of the rolling die 35 does not ride on the outer peripheral surfaces of the first small-diameter shaft portion 23 and the second small-diameter shaft portion 24. However, in this example, in order to secure the strength of the outer diameter d1 of the first small-diameter shaft portion 23 and the outer diameter d2 of the second small-diameter shaft portion 24, each of the outer diameter d1 of the first small-diameter shaft portion 23 and the outer diameter d2 of the second small-diameter shaft portion 24 is 0.9 times or more and less than 1.0 times the groove bottom diameter Da of the male threaded portion 26, and preferably 0.9 times or more and less than 1.0 times.

When carrying out the present invention, rolling trace lengths of the first rolling trace 27 and the second rolling trace 28 and axial ranges forming the first rolling trace 27 and the second rolling trace 28 can be set to arbitrary values. For example, each of the rolling trace lengths (L: the axial length of each of the first rolling trace 27 and the second rolling trace 28 when the screw rotates once) of the first rolling trace 27 and the second rolling trace 28 is set to be about 0.03 times to 2.5 times the thread lead of the male threaded portion 26, and preferably about 0.5 times to 2 times. That is, each of the axial lengths (L1=the axial length of each of the first medium-diameter shaft portion 21 and the second medium-diameter shaft portion 22) forming the first rolling trace 27 and the second rolling trace 28 can be about 0.03 times to 2.5 times the thread pitch of the male threaded portion 26, and preferably about 0.5 times to 2 times.

As described above, when the relationship between the groove bottom diameter Da of the male threaded portion 26, the outer diameter D1 of the first medium-diameter shaft portion for rolling 33, the outer diameter D2 of the second medium-diameter shaft portion for rolling 34, the outer diameter d1 of the first small-diameter shaft portion 23, and the outer diameter d2 of the second small-diameter shaft portion 24 is expressed by formulas, if rolling processing is performed to form the male threaded portion 26, it is preferable to adopt following dimensional relationships.

D1: Da−(Da×0.070) or more, Da+(Da×0.070) or less
D2: Da−(Da×0.070) or more, Da+(Da×0.070) or less
d1: Da−(Da×0.1) or more, less than Da
d2: Da−(Da×0.1) or more, less than Da Further, when carrying out the present invention, regarding the groove bottom diameter Da of the male threaded portion 26, the outer diameter D1 of the first medium-diameter shaft portion for rolling 33, the outer diameter D2 of the second medium-diameter shaft portion for rolling 34, the outer diameter d1 of the first small-diameter shaft portion 23, and the outer diameter d2 of the second small-diameter shaft portion 24, it is more preferable to adopt following dimensional relationships.

D1: Da+(Da×0.001 times to 0.070 times)
D2: Da+(Da×0.001 times to 0.070 times)
d1: Da−(Da×0.001 times to 0.070 times)
d2: Da−(Da×0.001 times to 0.070 times)

That is, in order to sufficiently suppress the inclination of the rolling die 35 with respect to the workpiece 31 during the rolling processing, each of the outer diameters D1 and D2 is preferably larger than the groove bottom diameter Da, for example, "Da+(Da×0.001 times)" or more. Also, in order to easily prevent the chamfered portions 37 of the rolling dies 35 from riding on the outer peripheral surfaces of the first small-diameter shaft portion 23 and the second small-diameter shaft portion 24, each of the outer diameters d1 and d2 is preferably slightly smaller than the groove bottom diameter Da, for example, "Da−(Da×0.001 times)" or less. Also, in order to ensure sufficient rigidity of the first small-diameter shaft portion 23 and the second small-diameter shaft portion 24, more preferably, each of the outer diameters d1 and d2 is, for example, "Da−(Da×0.070 times)" or more.

In this case, when it is set such that
h: Tooth height of male threaded portion 26 (radial height from thread groove bottom portion to thread crest portion),
p: Pitch of male threaded portion 26 (axial distance between axially adjacent thread crest portions), and
L2: Axial dimension of each of first small-diameter shaft portion 23 and second small-diameter shaft portion 24,
L2 is preferably set to be h or more.

In particular, the minimum axial dimension L2 of each of the first small-diameter shaft portion 23 and the second small-diameter shaft portion 24 is about h+p×(0.05 times to 4 times), but it may be longer. The axial dimension L2 can preferably be about h+p×(0.50 times to 2.00 times).

Further, in the electric steering wheel position adjusting device 1 of this example, the entire male threaded portion 26 of the screw shaft 17 that forms the feed screw mechanism 12 is finished with high precision so as to function as a normal threaded portion. Therefore, when adjusting the front-rear position of the steering wheel 2, the rod 14 can be axially displaced relative to the nut 13 to a position where the axial end edge portion of the male threaded portion 26 is threadedly engaged with the female threaded portion 15. Therefore, an operating stroke of the feed screw mechanism 12 can be lengthened, in other words, an adjustment range of the front-rear position of the steering wheel 2 can be widened.

Further, in this example, in the rolling processing, the chamfered portions 37 of the rolling dies 35 do not ride on one axial end portion of the first medium-diameter shaft portion 21 and the other axial end portion of the second medium-diameter shaft portion 22. Therefore, in the rolling processing, there is no radial burr or bulge caused by the chamfered portions 37 riding on one axial end portion of the first medium-diameter shaft portion 21 and the other axial end portion of the second medium-diameter shaft portion 22. Therefore, for example, even when the screw shaft 17 is axially moved to a position where one axial end portion of the first medium-diameter shaft portion 21 and the other axial end portion of the second medium-diameter shaft portion 22 enter an radially inner side of the female threaded portion 15 of the nut 13, one axial end portion of the first medium-diameter shaft portion 21 and the other axial end portion of the second medium-diameter shaft portion 22 can be prevented from interfering with the female threaded portion 15. Therefore, also from this aspect, the operating stroke of the feed screw mechanism 12 can be lengthened.

In addition, in the embodiment described above, there is no portion of the screw shaft 17 that has an outer diameter larger than the outer diameter of the first medium-diameter shaft portion 21 further on one axial side than the first medium-diameter shaft portion 21. That is, in the workpiece 31, there is no portion having an outer diameter larger than the outer diameter of the first medium-diameter shaft portion for rolling 33 further on one axial side than the first medium-diameter shaft portion for rolling 33. Therefore, in a case where the present invention is carried out, when manufacturing a screw shaft in the same manner as in the above-described embodiment, even if the first small-diameter shaft portion 23 is omitted, that is, even if one axial end portion of the first medium-diameter shaft portion 21 is used as a free end, when performing rolling processing, the chamfered portions 37 on one axial sides of the pair of rolling dies 35 can be prevented from riding on the outer peripheral surfaces of the first medium-diameter shaft portion for rolling 33 (first medium-diameter shaft portion 21). Therefore, when carrying out the present invention, the first small-diameter shaft portion 23 may be omitted when manufacturing a screw shaft in the same manner as in the above-described embodiment.

For example, the present invention can also be applied to a screw shafts having an adjacent shaft portion having an outer diameter larger than the outer diameter of the first medium-diameter shaft portion 21 only on one axial side of the first medium-diameter shaft portion 21 and having no adjacent shaft portion having an outer diameter larger than the outer diameter of the second medium-diameter shaft portion 22 on the other axial side of the second medium-diameter shaft portion 22. In this case, while the first small-diameter shaft portion 23 is required, the second small-diameter shaft portion 24 may not be required. That is, in this case, the second small-diameter shaft portion 24 can be provided, or the second small-diameter shaft portion 24 can be omitted.

Further, in the embodiment described above, the base end shaft portion 25 having an outer diameter larger than the outer diameter of the second medium-diameter shaft portion 22 is present on the screw shaft 17 further on the other axial side than the second medium-diameter shaft portion 22. That is, the base end shaft portion 25 having an outer diameter larger than the outer diameter of the second medium-diameter shaft portion for rolling 34 exists further on the other axial side than the second medium-diameter shaft portion for rolling 34 in the workpiece 31. In this case, in this embodiment, when manufacturing a screw shaft by a method similar to that of the embodiment described above, as illustrated in FIG. 2B, in the screw shaft, both the first small-diameter shaft portion and the second small-diameter shaft portion can be omitted, and the base end shaft portion 25 can be arranged adjacent to the other axial side of the second medium-diameter shaft portion 22. That is, in the workpiece, both the first small-diameter shaft portion and the second small-diameter shaft portion may be omitted, and the base end shaft portion 25 may be arranged adjacent to the other axial side of the second medium-diameter shaft portion for rolling 34. In this case, it is preferable to appropriately control the outer diameter of the second medium-diameter shaft portion for rolling 34 (second medium-diameter shaft portion 22) and set it small within a range in which rolling traces with a helical shape are formed. Therefore, it is possible to suppress a decrease in machining accuracy due to the chamfered portions 37 on the other axial sides of the pair of rolling dies 35 riding on the outer peripheral surfaces of the second medium-diameter shaft portions for rolling (second medium-diameter shaft portion 22)

It is preferable that the base end shaft portion 25 be arranged on the other axial side of the second medium-diameter shaft portion 22 via the second small-diameter shaft portion 24. That is, it is preferable to dispose the base end shaft portion 25 via the second small-diameter shaft portion 24 on the other axial side of the second medium-diameter shaft portion for rolling 34 in the workpiece. When the second small-diameter shaft portion 24 is arranged between the other axial side of the second medium-diameter shaft portion 22 and the base end shaft portion when performing rolling processing, it is possible to reliably prevent the chamfered portions 37 on the other axial sides of the pair of rolling dies 35 from riding on the outer peripheral surface of the second medium-diameter shaft portion for rolling 34 (second medium-diameter shaft portion 22). Therefore, when carrying out the present invention, it is even more preferable to dispose the second small-diameter shaft portion 24 on at least one end portion when manufacturing a screw shaft in a manner similar to that of the above-described embodiment.

Further, when the first medium-diameter shaft portion for rolling 33 (first medium-diameter shaft portion 21) is arranged on one axial side of the large-diameter shaft portion for rolling 32 (male threaded portion 26) and the first small-diameter shaft portion 23 is arranged on this one axial side, and further the second medium-diameter shaft portion for rolling 34 (second medium-diameter shaft portion 22) is arranged on the other axial side of the large-diameter shaft portion for rolling 32 (male threaded portion 26), and the second small-diameter shaft portion 24 is arranged on this other axial side, by observing surfaces of the first small-diameter shaft portion 23 and the second small-diameter shaft portion 24, it is also possible to determine whether the rolling is performed normally. That is, when there is a rolling trace on the first small-diameter shaft portion 23 or the second small-diameter shaft portion 24, it can be determined that this indicates that the parts that flows due to the rolling processing does not escape to the small-diameter shaft portion, and that it has a significant adverse effect on screw accuracy. On the other hand, when the rolling is performed normally, the first small-diameter shaft portion 23 and the second small-diameter shaft portion 24 will not have rolling traces. Therefore, the arrangement of the first small-diameter shaft portion 23 and the second small-diameter shaft portion 24 can also be used as a guideline for finding defective products when manufacturing high-precision screws. In addition, when a defect occurs, the first small-diameter shaft portion 23 or the second small-diameter shaft portion 24 are not necessarily helically scarred and may be short scratched at either location.

As described above, when the screw shaft 17 according to the present embodiment has either the first small-diameter shaft portion 23 or the second small-diameter shaft portion 24 and there are no rolling traces on these, it can be determined that rolling is normally performed. In such a case, depending on the outer diameter of the medium-diameter shaft portion, even when the axial distribution of the rolling load acting between the pair of rolling dies 35 and the workpiece 31 is slightly deviated, in some cases, the first medium-diameter shaft portion 21 and the second medium-diameter shaft portion 22 are not formed with rolling traces with a helical shape. Specifically, a slight deviation may cause scratches on a part of the surfaces of the first medium-diameter shaft portion 21 and the second medium-diameter shaft portion 22. Even in such cases, it shows that the first medium-diameter shaft portion 21 and the second medium-diameter shaft portion 22 suppress the shake of the shaft, and thus it can be determined that the machining accuracy of both axial end portions of the male threaded portion 26 is good.

The screw shaft 17 of this example can also be used by incorporating it into a device having a configuration different from that of this example. In this case, for example, the base end shaft portion 25, which is the adjacent shaft portion, can be used as a portion for combining with a driving member such as a motor. Specifically, for example, it is also possible to form a serration on the outer peripheral surface of the base end shaft portion 25, injection-mold a synthetic resin gear so as to cover the serration and construct a speed reduction mechanism installed between the motor and the screw shaft 17 using the gear. When adopting such a configuration, since the outer diameter of the base end shaft portion 25 is large, the amount of synthetic resin used as the gear material can be reduced. As a result, the amount of using synthetic resin, which is an expensive material, is reduced, thereby reducing manufacturing costs and effectively preventing deformation of the synthetic resin during molding and use of the gear.

Figure 10:
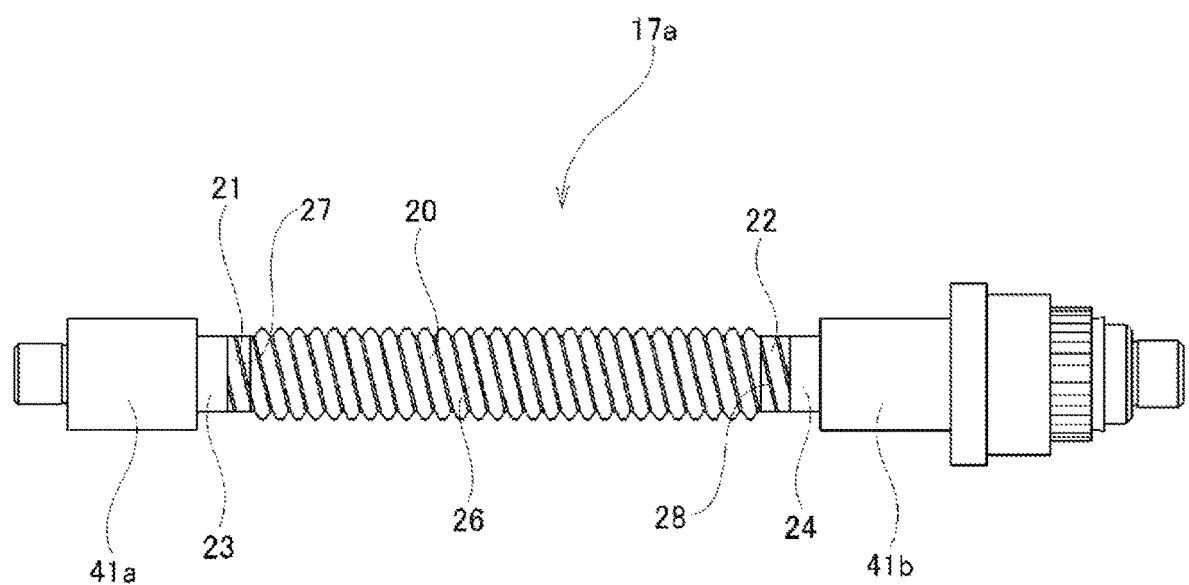
FIG. 10 is a side view illustrating another example of a screw shaft to which the present invention can be applied.
Figure 11A:
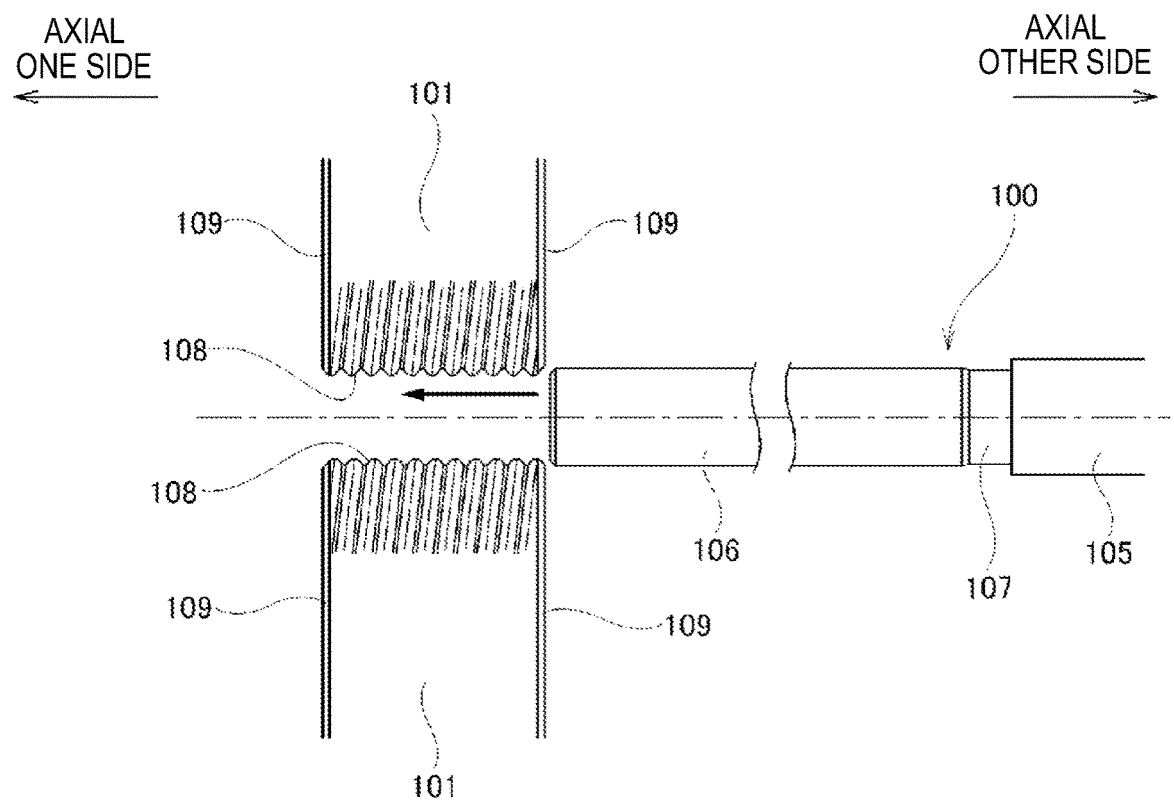
FIG. 11A is a side view illustrating a starting stage of processing for forming a male threaded portion by rolling processing using through-feed method of the related art.
Figure 11B:
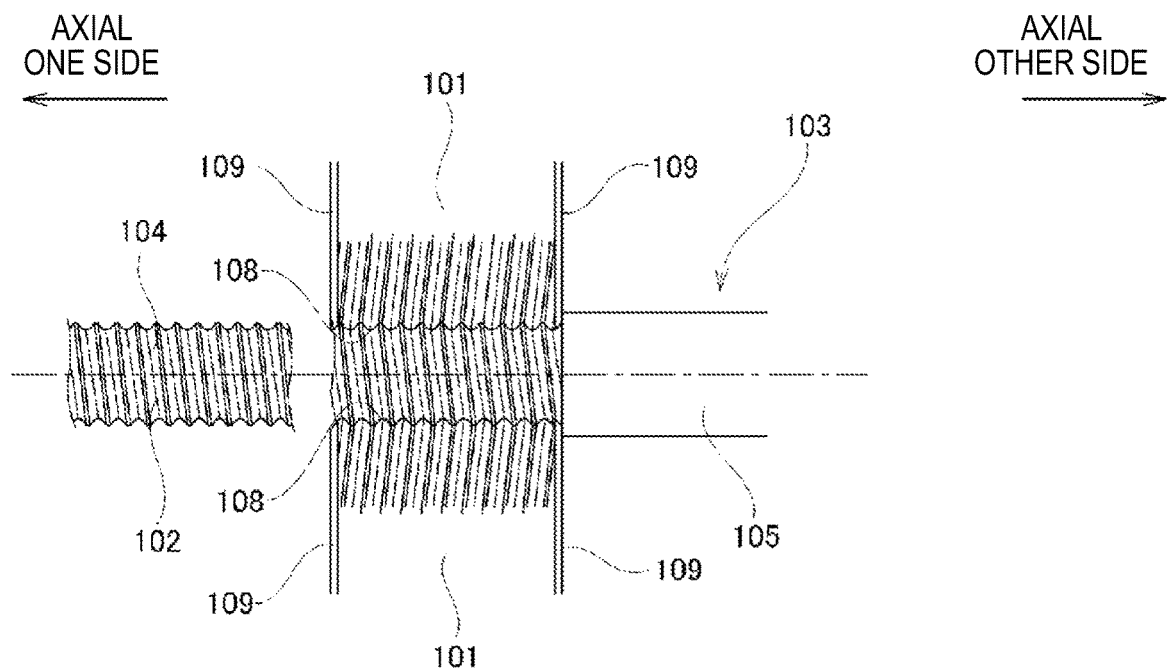
FIG. 11B is a side view illustrating a final stage of the processing.
Figure 12:
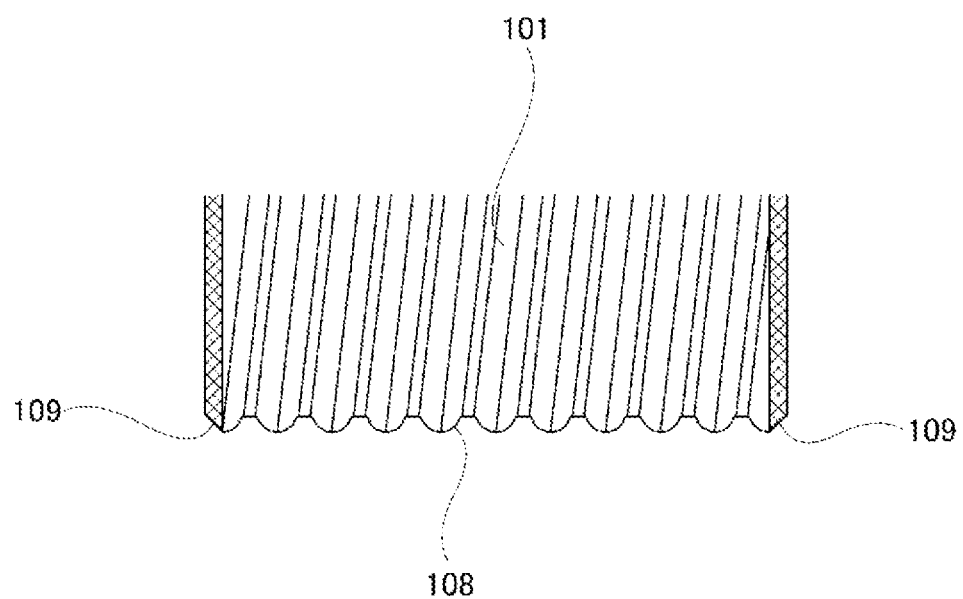
FIG. 12 is a partially enlarged view of a rolling die used in the processing illustrated in FIGS. 11A and 11B.
Figure 13A:
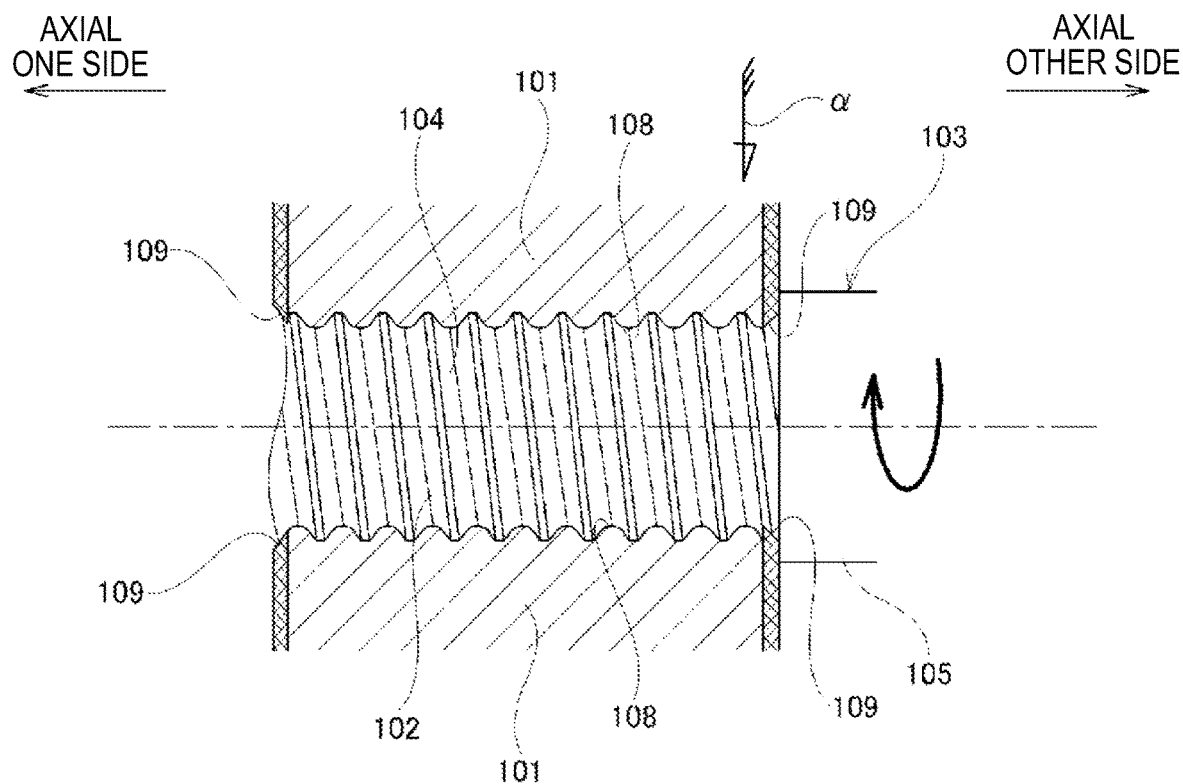
FIG. 13A is a partially enlarged cross-sectional view of FIG. 11B.
Figure 13B:
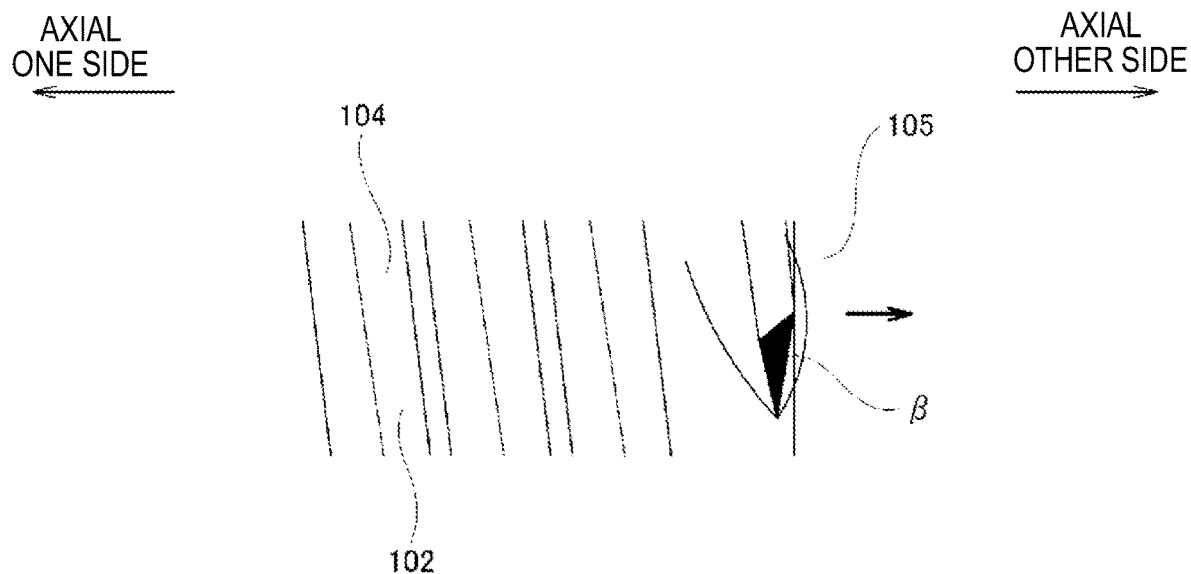
FIG. 13B is a view seen from the arrow a of the screw shaft in FIG. 13A.

The rolling method for a screw shaft of the present invention is not limited to the in-feed method in the embodiment described above, and other rolling methods such as a through-feed method and a flat plate rolling method can also be adopted. Among these, the through-feed method can be adopted as a rolling method for a screw shaft that do not have large-diameter portions having an outer diameter larger than the outer diameter of the medium-diameter shaft portion on both axial sides. Alternatively, the through-feed method can be adopted as a rolling method for a screw shaft provided with a large-diameter portion having an outer diameter larger than that of a medium-diameter shaft portion only on one axial side. In the case of adopting the through-feed method, it is not essential to provide a small-diameter shaft portion at a tip end portion, which is an axial end portion of the workpiece on a side where insertion between the rolling dies is started. However, by providing the small-diameter shaft portion at the tip end portion of the workpiece, the small-diameter portion can also be used as a guiding portion when inserting the workpiece between the dies, that is, a guidance portion. The in-feed method can be adopted as the rolling method for a screw shaft similar to that of the through-feed method, and can also be adopted as a rolling method for the screw shaft 17a as illustrated in FIG. 10, for example. The screw shaft 17a is provided with large-diameter portions (adjacent shaft portions) having an outer diameter larger than that of the medium-diameter shaft portion on both axial sides. Specifically, the screw shaft 17a includes a large-diameter portion 41a corresponding to a medium-diameter shaft portion having an outer diameter larger than the outer diameter of the first medium-diameter shaft portion 21 and arranged adjacent to the first small-diameter shaft portion 23 on one axial side, and a large-diameter portion 41b corresponding to a medium-diameter shaft portion having an outer diameter larger than the outer diameter of the second medium-diameter shaft portion 22 and arranged adjacent to the second small-diameter shaft portion 24 on the other axial side.

When carrying out the manufacturing method of the screw shaft of the present invention, the number of rolling dies used for rolling processing can be three or more.

The present invention can be applied not only to a screw shaft that forms a sliding screw type feed screw mechanism, but also to a screw shaft that forms a ball screw type feed screw mechanism. In this case, the male threaded portion of the screw shaft becomes the male thread groove. Further, when the present invention is applied to a screw shaft that forms a sliding screw type feed screw mechanism, various shapes such as a triangular tooth shape, a trapezoidal tooth shape, an involute tooth shape, and a serration tooth shape can be adopted for the thread shape of the male threaded portion. The present invention is not limited by the number of threads, the number of teeth of serrations, or the like.

The electric steering wheel position adjusting device of the present invention can be applied to devices known in related arts, which are described in JP-A-2005-199760, JP-A-2006-321484, JP-A-2015-227166, and the like, having various structures, specifically, devices that enable adjustment of at least one of the front-rear position and the up-down position of a steering wheel.

The feed screw mechanism provided with the screw shaft of the present invention is not limited to the electric steering wheel position adjusting device, but can be used by incorporating it into various mechanical devices such as a steering wheel of an automobile, an electric storage device of a headlight, and a table moving device of a machine tool.

Although various embodiments are described above with reference to the drawings, it goes without saying that the present invention is not limited to such examples. It is clear that a person skilled in the art can conceive of various changed examples or modification examples within the scope described in the claims, and it is understood that these also belong to the technical scope of the present invention. Moreover, each component in the above-described embodiments may be combined arbitrarily without departing from the gist of the invention.

REFERENCE SIGNS LIST

1: electric steering wheel position adjusting device
2: steering wheel
3: steering column
4: steering shaft
5: electric actuator
6: outer column
7: inner column
8: inner shaft
9: outer tube
10: bearing
11: housing
12: feed screw mechanism
13: nut
14: rod
15: female threaded portion
16: worm reduction gear
17, 17a: screw shaft
18: extension shaft
19: arm portion
20: large-diameter shaft portion
21: first medium-diameter shaft portion
22: second medium-diameter shaft portion
23: first small-diameter shaft portion
24: second small-diameter shaft portion
25: base end shaft portion
26: male threaded portion
27: first rolling trace
28: second rolling trace
29: flange portion
30: fitting portion
31: workpiece
32: large-diameter shaft portion for rolling
33: first medium-diameter shaft portion for rolling
34: second medium-diameter shaft portion for rolling
35: rolling die
36: rolling teeth
37: chamfered portion 38: chamfered portion
39: chamfered portion
40: groove portion
41a, 41b: large-diameter portion
100: workpiece
101: rolling die
102: male threaded portion
103: screw shaft
104: screw shaft portion
105: base end shaft portion
106: large-diameter shaft portion for rolling
107: small-diameter shaft portion for rolling
108: rolling teeth
109: chamfered portion

The invention claimed is:

1. A screw shaft, comprising a large-diameter shaft portion, a medium-diameter shaft portion, and a small-diameter shaft portion, wherein:
the large-diameter shaft portion has a male threaded portion along an entire axial length on an outer peripheral surface;
the medium-diameter shaft portion is arranged axially adjacent to the large-diameter shaft portion and has an outer diameter smaller than an outer diameter of the large-diameter shaft portion;
the small-diameter shaft portion is arranged adjacent to the medium-diameter shaft portion on a side opposite to the large-diameter shaft portion in an axial direction, has an outer diameter smaller than the outer diameter of the medium-diameter shaft portion, and does not have a rolling trace with a helical shape on an outer peripheral surface;
the medium-diameter shaft portion has, on the outer peripheral surface, a rolling trace with a helical shape that is in phase with an extension line of a helical curve that is a groove bottom line of the male threaded portion;
the medium-diameter shaft portion is composed of a first medium-diameter shaft portion arranged on one axial side of the large-diameter shaft portion and a second medium-diameter shaft portion arranged on the other axial side of the large-diameter shaft portion;
the small-diameter shaft portion is composed of at least one of a first small-diameter shaft portion arranged on one axial side of the first medium-diameter shaft portion and a second small-diameter shaft portion arranged on the other axial side of the second medium-diameter shaft portion; and
an axial length of the male threaded portion corresponds to an effective threaded length.

2. The screw shaft according to claim 1, wherein
an adjacent shaft portion having an outer diameter larger than the outer diameter of the medium-diameter shaft portion is provided adjacent to the small-diameter shaft portion on a side opposite to the large-diameter shaft portion in the axial direction.

3. The screw shaft according to claim 1, wherein
the outer diameter of the medium-diameter shaft portion is 0.93 times or more and 1.07 times or less a groove bottom diameter of the male threaded portion.

4. The screw shaft according to claim 1, wherein
the outer diameter of the small-diameter shaft portion is 0.9 times or more and less than 1.0 times a groove bottom diameter of the male threaded portion.

5. The screw shaft according to claim 1, which is incorporated in an electric steering wheel position adjusting device.

6. A manufacturing method of a screw shaft, comprising:
performing rolling processing on a workpiece, the workpiece including a large-diameter shaft portion for rolling, a medium-diameter shaft portion for rolling arranged axially adjacent to the large-diameter shaft portion for rolling and having an outer diameter smaller than an outer diameter of the large-diameter shaft portion for rolling, and a small-diameter shaft portion arranged adjacent to the medium-diameter shaft portion for rolling on a side opposite to the large-diameter shaft portion for rolling in an axial direction and having an outer diameter smaller than the outer diameter of the medium-diameter shaft portion for rolling, using a plurality of rolling dies to create progress of the workpiece in order to form a male threaded portion over an entire axial length of an outer peripheral surface of the large-diameter shaft portion for rolling, wherein:
in performing the rolling processing on the workpiece, rolling processing is performed, using the rolling dies, to form a male threaded portion on the outer peripheral surface of the large-diameter shaft portion for rolling, and the rolling dies are not brought into contact with an outer peripheral surface of the small-diameter shaft portion;
in performing the rolling processing on the workpiece, a rolling trace with a helical shape is formed on an outer peripheral surface of the medium-diameter shaft portion for rolling;
a workpiece in which the medium-diameter shaft portion for rolling is composed of a first medium-diameter shaft portion for rolling arranged on one axial side of the large-diameter shaft portion for rolling and a second medium-diameter shaft portion for rolling arranged on the other axial side of the large-diameter shaft portion for rolling, and the small-diameter shaft portion is composed of at least one of a first small-diameter shaft portion arranged on one axial side of the first medium-diameter shaft portion for rolling and a second small-diameter shaft portion arranged on the other axial side of the second medium-diameter shaft portion for rolling is used as the workpiece; and
an axial length of the male threaded portion corresponds to an effective threaded length.

7. The screw shaft according to claim 1, wherein
an outer diameter of the first small-diameter shaft portion is smaller than an outer diameter of the second small-diameter shaft portion.

8. The screw shaft according to claim 1, wherein
an axial dimension of each of the first small-diameter shaft portion and the second small-diameter shaft portion is equal to or larger than a tooth height of the male threaded portion.

9. The manufacturing method of the screw shaft according to claim 6, wherein
an outer diameter of the first small-diameter shaft portion is smaller than an outer diameter of the second small-diameter shaft portion.

10. The manufacturing method of the screw shaft according to claim 6, wherein
a workpiece having an adjacent shaft portion arranged adjacent to the small-diameter shaft portion on a side opposite to the large-diameter shaft portion for rolling in the axial direction and having an outer diameter larger than the outer diameter of the medium-diameter shaft portion for rolling is used as the workpiece.

11. The manufacturing method of the screw shaft according to claim 6, wherein:

the outer diameter of the medium-diameter shaft portion for rolling is 0.93 times or more and 1.07 times or less a groove bottom diameter of the male threaded portion to be formed on the outer peripheral surface of the large-diameter shaft portion for rolling; and the outer diameter of the small-diameter shaft portion is 0.9 times or more and less than 1.0 times a groove bottom diameter of the male threaded portion.

12. The manufacturing method of the screw shaft according to claim 6, wherein:
a rolling die having a chamfered portion at an axial end portion of an outer peripheral surface is used as each of the rolling dies; and
a state in which the chamfered portion faces the outer peripheral surface of the small-diameter shaft portion is maintained in performing the rolling processing on the workpiece.

13. The manufacturing method of the screw shaft according to claim 6, wherein
a screw shaft incorporated in an electric steering wheel position adjusting device is applied as the screw shaft.

14. An electric steering wheel position adjusting device, comprising:
an electric motor, a feed screw mechanism, and a steering component, wherein:

the feed screw mechanism includes a screw shaft having a male threaded portion on an outer peripheral surface, and a nut having an inner peripheral surface with a female threaded portion that engages with the male threaded portion and is configured such that the screw shaft and the nut are relatively displaceable in an axial direction based on relative rotation of the screw shaft and the nut by a rotational force transmitted from the electric motor;

the steering component is fixed to a steering wheel in use and is displaceable in a position adjustment direction of the steering wheel as the screw shaft and the nut are displaced relative to each other in the axial direction; and the screw shaft is configured by the screw shaft described in claim 5.

15. The manufacturing method of the screw shaft according to claim 6, wherein
an axial dimension of each of the first small-diameter shaft portion and the second small-diameter shaft portion is equal to or larger than a tooth height of the male threaded portion.

* * * * *